US010437451B2

(12) United States Patent
Zhang et al.

(10) Patent No.: US 10,437,451 B2
(45) Date of Patent: Oct. 8, 2019

(54) METHOD AND SYSTEM FOR PRIVATE COMMUNICATION

(71) Applicant: Alibaba Group Holding Limited, George Town, Grand Cayman (KY)

(72) Inventors: Lili Zhang, Hangzhou (CN); Di Zhang, Hangzhou (CN); Zaixiang Chen, Hangzhou (CN); Yien Yin, Hangzhou (CN); Huachen Liu, Hangzhou (CN)

(73) Assignee: DINGTALK HOLDING (CAYMAN) LIMITED, Grand Cayman (KY)

( * ) Notice: Subject to any disclaimer, the term of this patent is extended or adjusted under 35 U.S.C. 154(b) by 151 days.

(21) Appl. No.: 15/699,912

(22) Filed: Sep. 8, 2017

(65) Prior Publication Data

US 2018/0081529 A1    Mar. 22, 2018

(30) Foreign Application Priority Data

Sep. 18, 2016 (CN) .......................... 2016 1 0829649

(51) Int. Cl.
*G06F 3/048* (2013.01)
*G06F 3/0484* (2013.01)
(Continued)

(52) U.S. Cl.
CPC ........ *G06F 3/04847* (2013.01); *G06F 3/0482* (2013.01); *G06F 3/0488* (2013.01);
(Continued)

(58) Field of Classification Search
CPC ............. G06F 3/04847; G06F 3/04817; G06F 3/0482; G06F 3/0488; G06F 21/6245;
(Continued)

(56) References Cited

U.S. PATENT DOCUMENTS 7,035,923 B1    4/2006 Yoakum
7,133,687 B1    11/2006 El-Fishawy
(Continued)

FOREIGN PATENT DOCUMENTS

JP    2011517380    6/2011
JP    2014106592    6/2014
(Continued)

OTHER PUBLICATIONS

Gwynee, Guilford, "WeChat's little red envelopes are brilliant marketing for mobile payments," published on the internet at https://qz.com, on Jan. 29, 2014 (Year: 2014).

*Primary Examiner* — David Phantana-angkool
(74) *Attorney, Agent, or Firm* — Shun Yao; Park, Vaughan, Fleming & Dowler LLP

(57) ABSTRACT

Embodiments of the present application provide a method and system for private communication. During operation, the system may determine a privacy level from a plurality of privacy levels associated with a private chat function of a communication application. The private chat function may be configured to transmit and receive private chat messages, and each privacy level is associated with visual effects which are different from the visual effects of other privacy levels. The system may obtain mode configuration information corresponding to the selected privacy level. The system may then configure the private chat function for the communication application based on the obtained mode configuration information, and display the visual effects for the communication application according to the selected privacy level.

17 Claims, 20 Drawing Sheets

PRIVACY LEVEL CONFIGURATION PAGE
(WITH PREVIEW OF LOW PRIVACY LEVEL ICON)

(51) Int. Cl.
  *G06F 3/0481* (2013.01)
  *G06F 3/0482* (2013.01)
  *G06F 21/84* (2013.01)
  *H04L 12/58* (2006.01)
  *H04L 29/06* (2006.01)
  *G06F 21/62* (2013.01)
  *G06F 3/0488* (2013.01)
  *H04M 1/725* (2006.01)

(52) U.S. Cl.
  CPC ...... *G06F 3/04817* (2013.01); *G06F 21/6245* (2013.01); *G06F 21/84* (2013.01); *H04L 51/04* (2013.01); *H04L 51/12* (2013.01); *H04L 63/0407* (2013.01); *H04L 63/105* (2013.01); *H04L 63/205* (2013.01); *H04M 1/72552* (2013.01); *G06F 2221/2143* (2013.01); *H04L 51/34* (2013.01)

(58) Field of Classification Search
  CPC ......... G06F 21/84; H04L 51/04; H04L 51/12; H04L 63/0407; H04L 63/105; H04L 63/205; H04M 1/72552
  USPC ....................................................... 715/753
  See application file for complete search history.

(56) References Cited

U.S. PATENT DOCUMENTS

| | | | |
|---|---|---|---|
| 7,197,122 B2 | 3/2007 | Vuori | |
| 7,233,975 B1* | 6/2007 | Gerraty | H04L 45/02 707/999.008 |
| 7,398,252 B2 | 7/2008 | Neofytides | |
| 7,603,413 B1 | 10/2009 | Herold | |
| 7,653,691 B2 | 1/2010 | Lasensky | |
| 7,818,415 B2* | 10/2010 | Jhanji | G06Q 30/0259 709/223 |
| 7,835,955 B1 | 11/2010 | Brodsky | |
| 8,165,609 B2 | 4/2012 | Fang | |
| 8,316,096 B2 | 11/2012 | Svendsen | |
| 8,355,699 B1 | 1/2013 | Lo | |
| 8,548,865 B1 | 10/2013 | Ho | |
| 8,670,791 B2 | 3/2014 | Ye | |
| 8,768,310 B1 | 7/2014 | Oroskar | |
| 8,769,022 B2 | 7/2014 | Tivyan | |
| 8,788,602 B1 | 7/2014 | Wan | |
| 8,843,117 B2 | 9/2014 | Sigmund | |
| 8,856,244 B2 | 10/2014 | Madnani | |
| 8,880,725 B2 | 11/2014 | Ananthanarayanan | |
| 8,968,103 B2 | 3/2015 | Zhou | |
| 9,021,040 B1 | 4/2015 | Andrews | |
| 9,117,197 B1 | 8/2015 | Sharma | |
| 9,143,477 B2 | 9/2015 | Murthy | |
| 9,185,062 B1 | 11/2015 | Yang | |
| 9,230,244 B2 | 1/2016 | Patil | |
| 9,253,639 B1 | 2/2016 | Lafuente | |
| 9,756,091 B1* | 9/2017 | Davies | H04L 65/4015 |
| 9,760,566 B2* | 9/2017 | Heck | G06F 17/279 |
| 9,842,168 B2* | 12/2017 | Heck | G06F 16/9535 |
| 9,858,343 B2* | 1/2018 | Heck | G06F 17/2785 |
| 10,097,499 B1* | 10/2018 | Kumar | H04L 51/24 |
| 2002/0016163 A1 | 2/2002 | Burgan | |
| 2002/0120453 A1 | 8/2002 | Lee | |
| 2003/0084109 A1 | 5/2003 | Balluff | |
| 2003/0135559 A1 | 7/2003 | Bellotti | |
| 2003/0154249 A1 | 8/2003 | Crockett | |
| 2004/0002932 A1 | 1/2004 | Horvitz | |
| 2004/0006599 A1 | 1/2004 | Bates | |
| 2004/0102962 A1 | 5/2004 | Wei | |
| 2005/0055306 A1* | 3/2005 | Miller | G06Q 10/10 705/37 |
| 2005/0149855 A1 | 7/2005 | Loo | |
| 2005/0193129 A1* | 9/2005 | Barlow | H04L 12/1818 709/229 |
| 2006/0093142 A1 | 5/2006 | Schneier | |
| 2006/0229890 A1 | 10/2006 | Sattler | |
| 2007/0060193 A1 | 3/2007 | Kim | |
| 2007/0299565 A1 | 12/2007 | Oesterling | |
| 2008/0114776 A1 | 5/2008 | Sun | |
| 2008/0307040 A1 | 12/2008 | So | |
| 2008/0307094 A1 | 12/2008 | Karonen | |
| 2009/0018903 A1 | 1/2009 | Iyer | |
| 2009/0240497 A1 | 9/2009 | Usher | |
| 2009/0287776 A1 | 11/2009 | Corry | |
| 2010/0005402 A1 | 1/2010 | George | |
| 2010/0023341 A1 | 1/2010 | Ledbetter | |
| 2010/0056109 A1 | 3/2010 | Wilson | |
| 2010/0205541 A1 | 8/2010 | Rapaport | |
| 2010/0323752 A1 | 12/2010 | Park | |
| 2011/0019662 A1 | 1/2011 | Katis | |
| 2011/0035687 A1 | 2/2011 | Katis | |
| 2011/0136431 A1 | 6/2011 | Haaramo | |
| 2011/0173548 A1 | 7/2011 | Madnani | |
| 2011/0243113 A1 | 10/2011 | Hjelm | |
| 2012/0030301 A1 | 2/2012 | Herold | |
| 2012/0059842 A1 | 3/2012 | Hille-Doering | |
| 2012/0108268 A1 | 5/2012 | Lau | |
| 2012/0185547 A1 | 7/2012 | Hugg | |
| 2013/0080580 A1 | 3/2013 | Nagai | |
| 2013/0086071 A1 | 4/2013 | Riedel | |
| 2013/0138726 A1 | 5/2013 | Shin | |
| 2013/0144702 A1 | 6/2013 | Tabor | |
| 2013/0173723 A1 | 7/2013 | Herold | |
| 2013/0227029 A1 | 8/2013 | Hymel | |
| 2013/0227041 A1 | 8/2013 | Rideout | |
| 2013/0268418 A1 | 10/2013 | Sardi | |
| 2013/0268765 A1 | 10/2013 | Kent, Jr. | |
| 2013/0298006 A1 | 11/2013 | Good | |
| 2013/0311920 A1 | 11/2013 | Koo | |
| 2013/0332162 A1 | 12/2013 | Keen | |
| 2014/0025546 A1 | 1/2014 | Seng | |
| 2014/0191986 A1 | 7/2014 | Kim | |
| 2014/0279315 A1 | 9/2014 | Courter | |
| 2014/0280615 A1 | 9/2014 | Burlin | |
| 2014/0331150 A1 | 11/2014 | Griffin | |
| 2014/0372516 A1 | 12/2014 | Watte | |
| 2015/0039708 A1 | 2/2015 | Liu | |
| 2015/0081486 A1 | 3/2015 | Niazi | |
| 2015/0170104 A1 | 6/2015 | Yamada | |
| 2015/0207926 A1 | 7/2015 | Brown | |
| 2015/0256353 A1 | 9/2015 | Busey | |
| 2015/0264303 A1 | 9/2015 | Chastney | |
| 2015/0296450 A1 | 10/2015 | Koo | |
| 2015/0310567 A1 | 10/2015 | Wu | |
| 2015/0317590 A1 | 11/2015 | Karlson | |
| 2015/0350130 A1 | 12/2015 | Yang | |
| 2015/0350225 A1 | 12/2015 | Perold | |
| 2016/0055215 A1 | 2/2016 | Kauwe | |
| 2016/0062574 A1 | 3/2016 | Anzures | |
| 2016/0094509 A1 | 3/2016 | Ye | |
| 2016/0125363 A1 | 5/2016 | Hung | |
| 2016/0132971 A1 | 5/2016 | Teh | |
| 2016/0227019 A1 | 8/2016 | Seol | |
| 2016/0242007 A1 | 8/2016 | Mihara | |
| 2016/0261532 A1* | 9/2016 | Garbin | H04L 51/04 |
| 2017/0041255 A1 | 2/2017 | Dong | |
| 2017/0118147 A1 | 4/2017 | Dold | |
| 2017/0142212 A1 | 5/2017 | Bifulco | |
| 2017/0171135 A1 | 6/2017 | Wu | |
| 2017/0185965 A1 | 6/2017 | Nishizawa | |
| 2017/0228699 A1 | 8/2017 | Pang | |
| 2017/0353423 A1* | 12/2017 | Morrison | H04L 51/32 |
| 2018/0081529 A1* | 3/2018 | Zhang | G06F 21/6245 |
| 2018/0137264 A1* | 5/2018 | Kurian | G06F 21/32 |

FOREIGN PATENT DOCUMENTS

| | | |
|---|---|---|
| JP | 2014115716 | 6/2014 |
| WO | 1999037052 | 7/1999 |
| WO | 2007007330 | 1/2007 |
| WO | 2011117456 | 9/2011 |
| WO | 2014008782 | 1/2014 |
| WO | 2015017029 | 2/2015 |

(56) References Cited

FOREIGN PATENT DOCUMENTS

| | | |
|---|---|---|
| WO | 2015113458 | 8/2015 |
| WO | 2016016248 | 2/2016 |
| WO | 2016050146 | 4/2016 |
| WO | 2016050146 A1 | 4/2016 |
| WO | 2016054629 | 4/2016 |
| WO | 2016106248 A1 | 6/2016 |

* cited by examiner

PRIVATE CHAT
CONFIGURATION PAGE

PRIVACY LEVEL CONFIGURATION PAGE
(WITH PREVIEW OF LOW PRIVACY LEVEL ICON)

PRIVACY LEVEL CONFIGURATION PAGE
(WITH PREVIEW OF ICON INCLUDING NUMBER OF
NEW MESSAGES INDICATOR)

PRIVACY LEVEL CONFIGURATION PAGE (WITH PREVIEW OF MEDIUM PRIVACY LEVEL ICON)

PRIVACY LEVEL CONFIGURATION PAGE
(WITH PREVIEW OF ICON INCLUDING
NEW MESSAGE INDICATOR)

PRIVACY LEVEL CONFIGURATION PAGE
(WITH PREVIEW OF HIGH PRIVACY LEVEL ICON)

PRIVACY LEVEL CONFIGURATION PAGE
(WITH PREVIEW OF ICON INCLUDING
NEW MESSAGE INDICATOR)

MESSAGE LIST PAGE

PRIVATE CHAT LIST PAGE

PRIVATE CHAT PAGE

REGULAR CHAT WINDOW PAGE

FUNCTION MENU PAGE

CONTACT DETAILS PAGE

METHOD AND SYSTEM FOR PRIVATE COMMUNICATION

RELATED APPLICATION

Under 35 U.S.C. 119, this application claims the benefits and rights of priority of Chinese Patent Application No. 201610829649.3, filed 18 Sep. 2016.

The subject matter of this application is related to the subject matter in a co-pending non-provisional application by Lili Zhang, Qi Dong, and Hang Chen filed on 14 Jun. 2016, entitled "METHOD AND CLIENT TERMINAL FOR PROMPTING INSTANT COMMUNICATION MESSAGE," having Ser. No. 15/182,502, the disclosure of which is incorporated by reference herein.

BACKGROUND

Field

The present disclosure relates to communication technology, and particularly relates to a method and system for private communication.

Related Art

A communication application may protect a user's privacy by deleting a message after the user reads the message. Such an application may automatically delete the message in order to avoid leaving a historical record, thereby providing users with a safer and more private communication process. However, the approaches to privacy protection in such communication applications typically present the same display and processing modes to all users. Unfortunately, the approaches to privacy protection in these communication applications may not meet the varying demands of different users or the demands of a single user in different application scenarios.

SUMMARY

One embodiment of the present disclosure provides a system for private communication. During operation, the system may determine a privacy level from a plurality of privacy levels associated with a private chat function of a communication application. The private chat function may be configured to transmit and receive private chat messages, and each privacy level may be associated with visual effects which are different from the visual effects of other privacy levels. The system may obtain mode configuration information corresponding to the selected privacy level. The system may then configure the private chat function for the communication application based on the obtained mode configuration information, and display the visual effects for the communication application according to the selected privacy level.

BRIEF DESCRIPTION OF THE DRAWINGS

The accompanying drawings described herein are used for further understanding the present application and constitute a part of the present application, and the schematic embodiments of the present application and the descriptions thereof are used for interpreting the present application, rather than improperly limiting the present application. In which.

DETAILED DESCRIPTION OF EMBODIMENTS

The embodiments described in the present disclosure solve the problem of improving communication privacy by allowing a user to specify a privacy level associated with private chats. In a private communication system, each privacy level may be associated with different privacy protection features. An instant messaging application, such as enterprise instant messaging (EIM) application DingTalk, may allow the user to choose from a low privacy level, a medium privacy level, or a high privacy level. When the user is using the instant messaging application, the system may provide private chat information to the user by displaying an icon that corresponds to the set privacy level. When set to the low privacy level, the system may display an icon with the word "Secret" to remind the user of the selected privacy level. When the system receives new messages, the system may display a number near the icon with the word "Secret" to indicate the number of new messages that are available. When set to the medium privacy level, the system may display an icon resembling a pair of sunglasses. The system may also display a red dot near the sunglasses to indicate a new message is available. When set to the high privacy label, the system may display a semitransparent mosaic icon. The system may change the color of the semitransparent mosaic icon to indicate that there is a new message available.

The user may set the privacy levels for all communication partners, for groups of communication partners, or for each individual communication partner. The user may also set a waiting duration that specifies when the system automatically deletes a private chat message. By allowing the user to customize the privacy level configuration for the private chats, the system can satisfy the personal requirements of different users.

Exemplary Computing System for Private Communication

Figure 1:
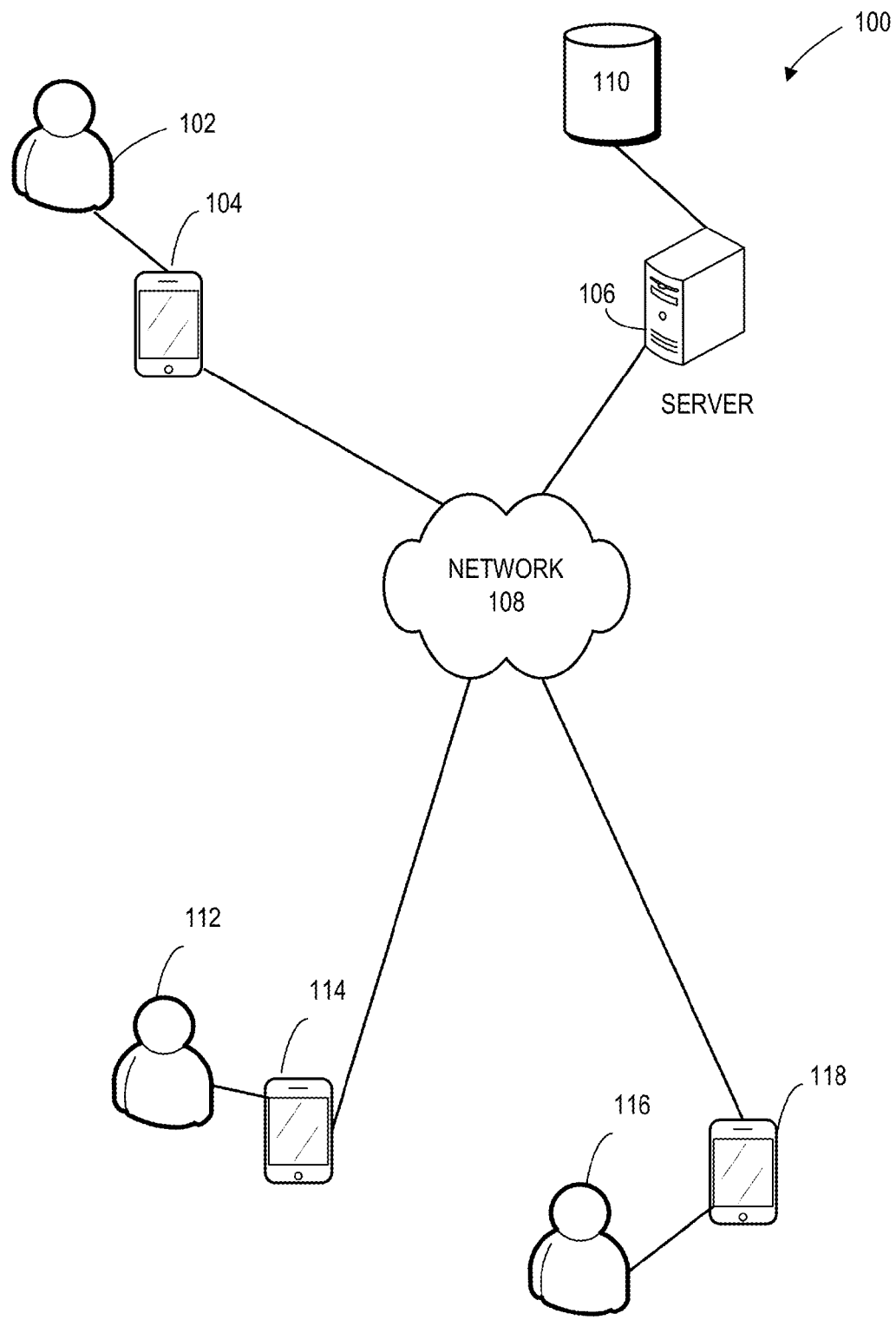
FIG. 1 presents a diagram illustrating an exemplary computing system for private communication, in accordance with an embodiment.

FIG. 1 presents a diagram illustrating an exemplary computing system 100 for private communication, in accordance with an embodiment. As illustrated in FIG. 1, a user 102 may be operating a computing device 104 with installed modules that allows user 102 to participate in instant messaging, view Internet webpages, initiate voice/video phone calls, share files, and receive e-mails. User 102 may also operate computing device 104 to send and receive private chat messages. Computing device 104 may be a mobile device such as a mobile phone, a tablet, a laptop, a desktop computer, or any other type of computing device. User 102 may represent, for example, a user associated with an organization. Computing device 104 may communicate with a server 106 over a network 108. Server 106 may represent a server that performs operations associated with processing private chat messages and/or related software. For example, some embodiments may include a server that supports a private chat function. Server 106 may include a storage 110 for storing code for various applications and other data, such as code for instant messaging software (including modules associated with the private chat function) and user and message data. Storage 110 may also store code for the modules described herein, such as code for a configuring module to configure a communication application based on a user-selected privacy level. Note that server 106 may represent a cluster of machines supporting functions of a server with private chat capabilities.

User 112 may operate a client 114, and user 116 may operate a client 118. For example, user 112 may operate client 114 to connect to server 106 and download instant messaging software. User 112 may also use client 114 to conduct instant messaging with other parties, such as user 102. Note that each of clients 114, 118 may be a mobile device such as a mobile phone, a tablet, a laptop, a desktop computer, or any other type of computing device.

In some embodiments, a client may send a request for customized executable code that when installed allows for instant messaging and/or private messaging and/or interacting with server 106. The client may receive the executable code from server 106 and then install the executable code to enable instant messaging, private messaging, and other user interaction with server 106. Further, server 106 may automatically update the executable code. Furthermore, an application and/or operating system executing on a client may also load modules and/or other data into memory only when needed, in order to efficiently utilize memory space. The client may also encrypt communications, such as the private messages, while the communications are sent across the network. This prevents eavesdropping by third parties not authorized to view the communications.

In some embodiments, the system may use rules to generate the visual effects associated with each of the privacy levels. The system may display different visual effects for each privacy level according to a respective set of rules for the privacy level. The system may apply various rules that specify the computations involved in the display of graphical elements such as the graphical elements described herein. For example, the system may calculate the graphical modifications, transparency level, or degree of blurriness of a visual element such as an icon by performing computations based on the properties of the pixels on a display. For example, the system may apply rules to calculate transparency level or blurring effects or other visual effects described herein. For example, the system may select and apply rules to compute the appropriate modifications to achieve a desired or specific outcome, such as an appropriate visual effect or other effect. The system may also obtain rules specifying different processes associated with the different privacy levels, and perform the different processes according to the different rules. In some embodiments, the system may also perform the operations described herein without the use of rules.

Note that the techniques discussed in the present disclosure represent an improvement in various technology areas such as human-machine interaction, user interfaces, communication security, and digital communications.

Exemplary Process for Private Communication

Figure 2:
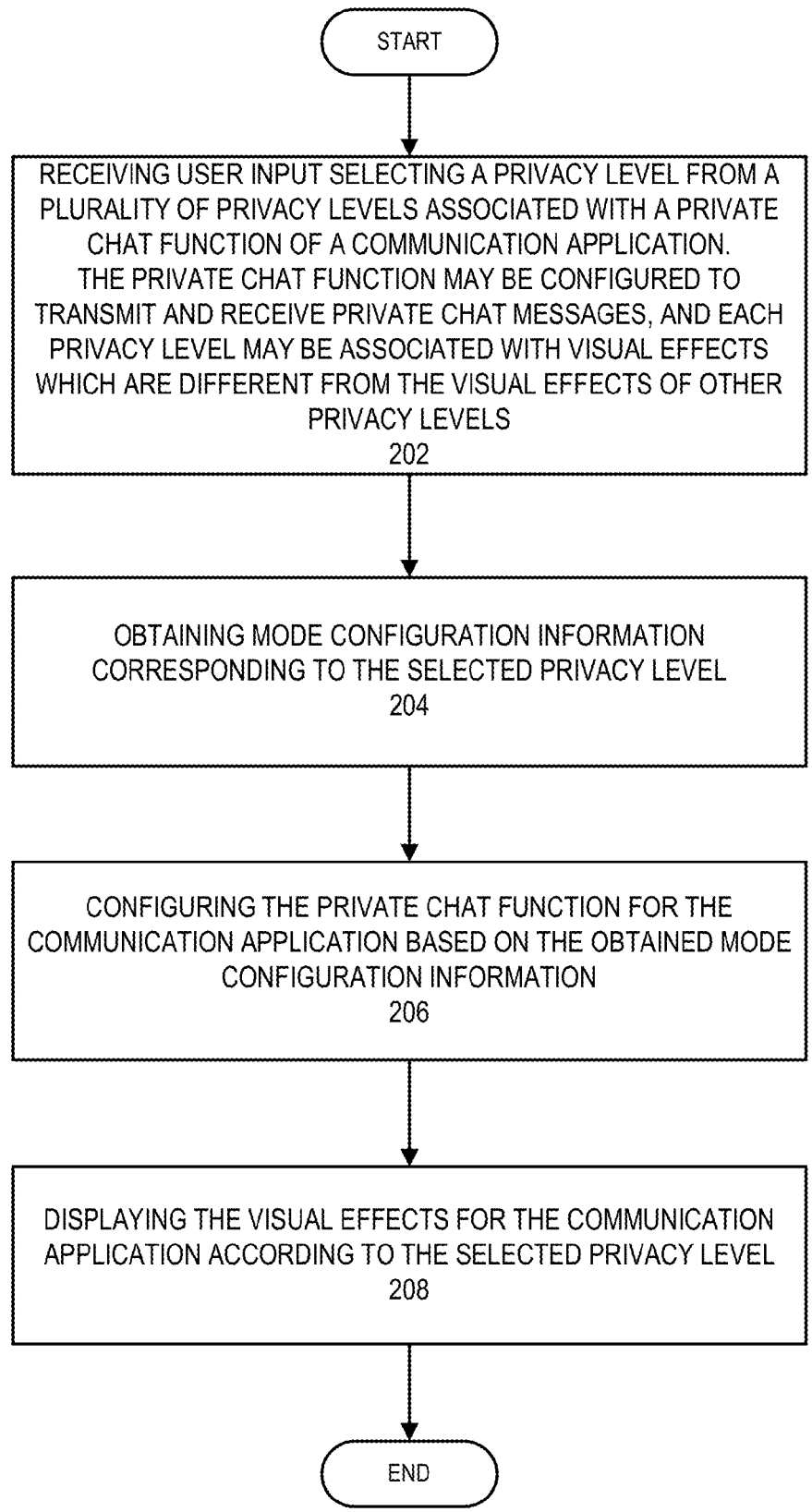
FIG. 2 presents a flowchart illustrating an exemplary process for private communication, in accordance with an embodiment.

FIG. 2 presents a flowchart illustrating an exemplary process for private communication, in accordance with an embodiment. A computing device operated by a user to communicate with others may perform the operations of FIG. 2.

The system (e.g., computing device) may receive user input selecting a privacy level from a plurality of privacy levels associated with a private chat function of a communication application (operation 202). The system may configure and use the private chat function to transmit and receive private chat messages. Each privacy level may be associated with visual effects which are different from the visual effects of other privacy levels. The system may also automatically delete private chat messages that have been read by a message recipient.

The system may obtain mode configuration information corresponding to the selected privacy level (operation 204). The system may next configure the private chat function for the communication application based on the obtained mode configuration information (operation 206). The system may then display the visual effects for the communication application according to the selected privacy level (operation 208). These operations are described in greater detail below.

The system (e.g., computing device) may receive user input selecting a privacy level from a plurality of privacy levels associated with a private chat function of a communication application (operation 202). Each privacy level may be associated with visual effects which are different from the visual effects of other privacy levels. The system may configure and use the private chat function to transmit and receive private chat messages, and may automatically delete private chat messages that have been read by the message recipient.

The communication application may be any application with a communication function. For example, the communication application may be an instant messaging application such as the enterprise instant messaging application DingTalk.

The private chat function may include a "burn after reading" capability. The system may monitor the read state of a private chat message. When the private chat message changes from an unread state to a read state, the system may delete the private chat message. The system may also start a timer with a predetermined duration and delete the corresponding private chat message upon the timer's timeout. The system may avoid leaving historical records by automatically deleting the private chat message, thereby erasing communication traces and providing reliable privacy and security. In some embodiments, the system may overwrite the storage locations in a storage device and/or memory locations that hold private chat message data by writing random data or other types of data to the storage locations and/or memory locations. In some embodiments, the system may encrypt the private chat messages, such as encrypting the private chat messages when temporarily storing the message data.

The system allows a user to specify privacy levels for individual communication partners, groups of communication partners, or all communication partners. The user may configure different privacy levels for different communication partners or different groups of communication partners. The user may also configure a privacy level for all associated communication partners listed in the communication application. The system may determine the individual privacy levels configured by the user for different communication partners in the communication application, and the system may determine the privacy levels configured by the user for all the communication partners listed in the communication application. The system thereby allows the user to easily set a privacy level for all communication partners and also to treat each communication partner differently according to their individual requirements.

The system may obtain mode configuration information corresponding to the selected privacy level (operation 204).

The system and/or administrator may define different privacy levels in advance. The system may generate corresponding mode configuration information for each privacy level. When a user selects a privacy level, the system may determine the corresponding mode configuration information for configuring the communication application based on predetermined relationships between each privacy level and corresponding mode configuration information.

The system may configure the private chat function for the communication application based on the obtained mode configuration information (operation 206).

The system may use the mode configuration information to configure the display mode of the private chat function. That is, after the system applies different mode configuration information, the display associated with the private chat function may change correspondingly. The visual intensity of the display mode may be inversely related to the privacy level. The lower the privacy level (e.g., relatively less privacy), the more intense (e.g., more noticeable or more perceptible) the visual perception may become, to allow the user to view and use the displayed information. As the privacy level increases (e.g., relatively greater privacy), the weaker the visual perception may become, to diminish the visual perception as much as possible in order to avoid being conspicuous to other users. This improves the privacy and security when the user uses the private chat function on the computing device, even if there are other users nearby.

In some embodiments, a preset function page of the communication application may include a page entry identifier of the private chat function. A preset function page is a page (e.g., screen) displayed by the communication application that allows the user to perform or more functions. The page entry identifier is an identifier (can also be called an indicator) that can be represented on a page by an icon corresponding to the privacy level selected by the user. When configuring the communication application based on the mode configuration information, the system may configure a display element (e.g., visual presentation) of the page entry identifier. This allows the display element to provide a different visual perception (e.g., different visual appearance) for a different privacy mode. The preset function page containing the display element may be at least one of the following pages: a message list page of the communication application, a regular chat window page of the communication application, a function menu page associated with the regular chat window page, and a contact details page of the communication application. The display element may also be included in other preset function pages, and are not limited to the listed pages.

The page entry identifier of the private chat function may perform two functions that include an entry indication function and a message received notification function. The entry indication function guides a user to enter, through the page entry identifier, the function page corresponding to the private chat function. By configuring the display element of the page entry identifier, the system may present a weaker visual perception at a higher privacy mode. At the higher privacy mode, when other users are viewing the contents displayed on the computing device, the guiding effect is reduced as much as possible. The message received notification function informs the user when the system receives a new private chat message.

In some embodiments, the system may present a first display element in a message-receiving-prompting state, and the system may present a second display element in a non-message-receiving-prompting state. In the message-receiving-prompting state, the system displays an icon informing the user of the selected privacy level and the system is waiting to receive a new message. In the non-message-receiving-prompting state, the system receives one or more messages and informs the user of the availability of new unread messages. By configuring the display element of the page entry identifier, the system may present a weaker visual perception for a higher privacy mode. This may prevent other users from becoming aware of the presence of the private chat message when the other users view the displayed content on the computing device.

In some embodiments, the privacy modes may be divided into different privacy levels such as a low privacy level, a medium privacy level, and a high privacy level. The system may utilize the schemes described below for the display elements associated with each privacy level.

With a predefined low privacy level, the first display element may include a text icon (e.g., an icon with displayed text) corresponding to a private chat function. A second display element may include a text icon corresponding to the private chat function with a number indicating a quantity of new unread messages near the text icon.

With a predefined medium privacy level, the first display element may include a graphic icon corresponding to the private chat function. The second display element may include a graphic icon corresponding to the private chat function with a new unread message indicator (e.g., visual indicator) near the graphic icon. When displayed, the new unread message indicator is a signal to the user that there are new unread messages.

With a predefined high privacy level, the first display element may include a fuzzy icon displayed with a first color corresponding to the private chat function. The second display element may include a fuzzy icon displayed with a second color. The color of the fuzzy icon may change from the first color to the second color to indicate that a new unread message is available.

The predetermined waiting duration corresponding to the private chat function may be configurable. The predetermined waiting duration may be inversely related to the privacy level. The system may automatically delete any private chat message received by the private chat function when the reading duration associated with the private chat message for a corresponding user reaches the predetermined waiting duration. At a higher privacy level, the system may automatically delete the private chat message after a shorter period of time, thereby providing improved security and privacy.

The system may then display the visual effects for the communication application according to the selected privacy level (operation 208).

The communication application allows the user to select a privacy level according to practical requirements by providing different privacy levels for the private chat function in the communication application. The private chat function may display different visual output (e.g. visual effects) and perform different communication processes according to the privacy level selected by the user, thereby satisfying the user's personalized requirements.

Another Exemplary Process for Private Communication

Figure 3:
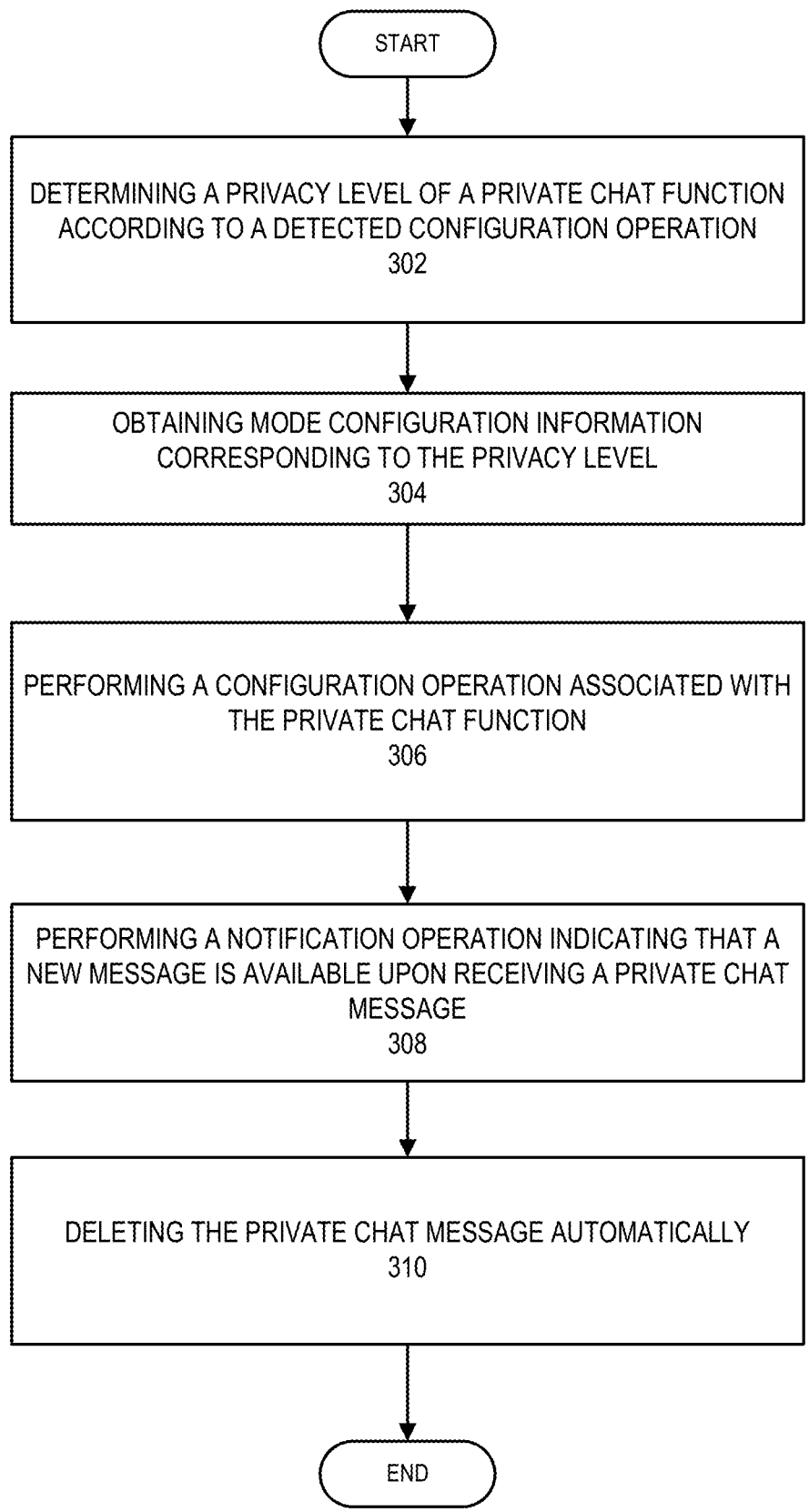
FIG. 3 presents a flowchart illustrating another exemplary process for private communication, in accordance with an embodiment.

FIG. 3 presents a flowchart illustrating another exemplary process for private communication, in accordance with an embodiment. A DingTalk client installed on a computing device may perform the process. As illustrated in FIG. 3, the system may determine a privacy level of a private chat function according to a detected configuration operation (operation 302). The system may obtain mode configuration information corresponding to the privacy level (operation 304). The system may perform a configuration operation associated with the private chat function (operation 306). The system may perform a notification operation indicating that a new message is available upon receiving a private chat message (operation 308). The system may then automatically delete the private chat message (operation 310). These operations are discussed in greater detail below.

The system may determine a privacy level of a private chat function according to a detected configuration operation (operation 302). The private chat function supported by the DingTalk client allows the user to configure, initiate and participate in a private chat (e.g., secret chat), and the DingTalk client may provide a private chat configuration page as illustrated in FIG. 4.

Exemplary Private Chat Configuration Page

Figure 4:
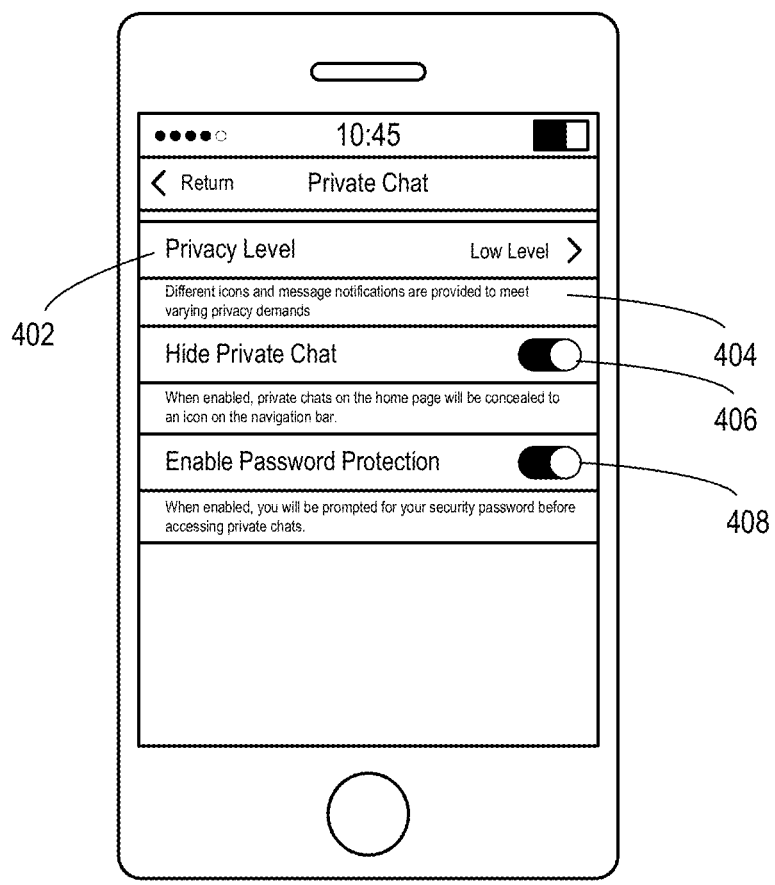
FIG. 4 presents a schematic diagram illustrating an exemplary private chat configuration page, in accordance with an embodiment.

FIG. 4 presents a schematic diagram illustrating an exemplary private chat configuration page, in accordance with an embodiment. The private chat configuration page may include a privacy level configuration option 402. For example, the privacy level of the communication application illustrated in FIG. 4 is set to a low privacy level. Below privacy level configuration option 402, the system may display text 404, which is "Different icons and message notifications are provided to meet varying privacy demands," in order to assist users with understanding the different privacy levels. The system may also display a switch 406 and a switch 408. Switch 406 allows the user to choose to hide the private chat. When enabled, the system conceals private chats on a home page (e.g., home screen) to an icon on a navigation bar. Switch 408 allows the user to choose to enable password protection, and the system prompts the user for a security password before allowing the user to access private chat messages.

Exemplary Privacy Level Configuration Pages

Figure 5:
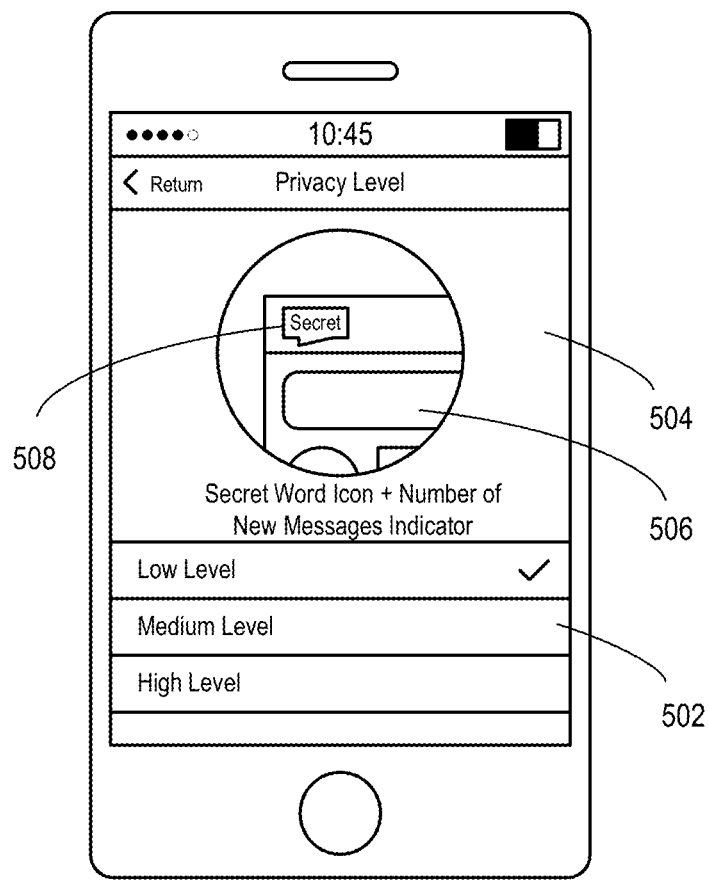
FIG. 5 presents a schematic diagram illustrating an exemplary privacy level configuration page set to a low privacy level with a preview of a secret word icon, in accordance with an embodiment.

FIG. 5 presents a schematic diagram illustrating an exemplary privacy level configuration page set to a low privacy level with a preview of a secret word icon, in accordance with an embodiment. After a user selects privacy level configuration option 402, the system may display the privacy level configuration page as illustrated in FIG. 5. The privacy level configuration page may include two functional regions. A first functional region 502 may display function options for choosing from the different privacy levels such as "Low Level," "Medium Level," and "High Level." Users may select from these different privacy levels. A second functional region 504 may display a preview 506 corresponding to the selected privacy level.

As illustrated in FIG. 5, first functional region 502 may be located at the bottom portion of the privacy level configuration page, and second functional region 504 may be located at the top portion of the privacy level configuration page. When a user selects the "Low Level" function option, the system may display informative text such as "Secret Word Icon+Number of New Messages Indicator" within second functional region 504. The system may also display a preview image 506 of the private chat function associated with the "Low Level" function option within second functional region 504.

Displayed preview image 506 may include a message-receiving-prompting state and a non-message-receiving-prompting state. The two states may be represented in an image that automatically switches between two frames, which the system may display in second functional region 504 in turn. For example, in a first frame, the system may display preview image 506 for the message-receiving-prompting state as illustrated in FIG. 5. Preview image 506 indicates the page entry identifier of the private chat function is represented by an icon containing a word "Secret" 508.

Figure 6:
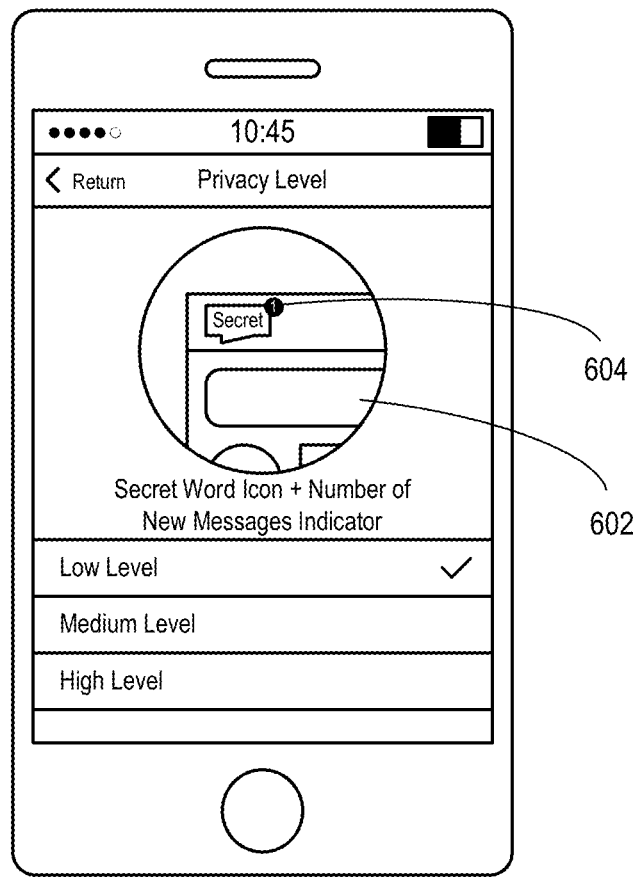
FIG. 6 presents a schematic diagram illustrating an exemplary privacy level configuration page set to a low privacy level with a preview of a secret word icon plus a number of new messages indicator, in accordance with an embodiment.

FIG. 6 presents a schematic diagram illustrating an exemplary privacy level configuration page set to a low privacy level with a preview of a secret word icon plus a number of new messages indicator, in accordance with an embodiment. In a second frame, the system may display a preview image 602 for the non-message-receiving-prompting state as illustrated in FIG. 6. Preview image 602 indicates the page entry identifier of the private chat function is represented by an icon with the word "Secret" with a number 604 (e.g., representing the number of new unread messages) displayed nearby.

Figure 7:
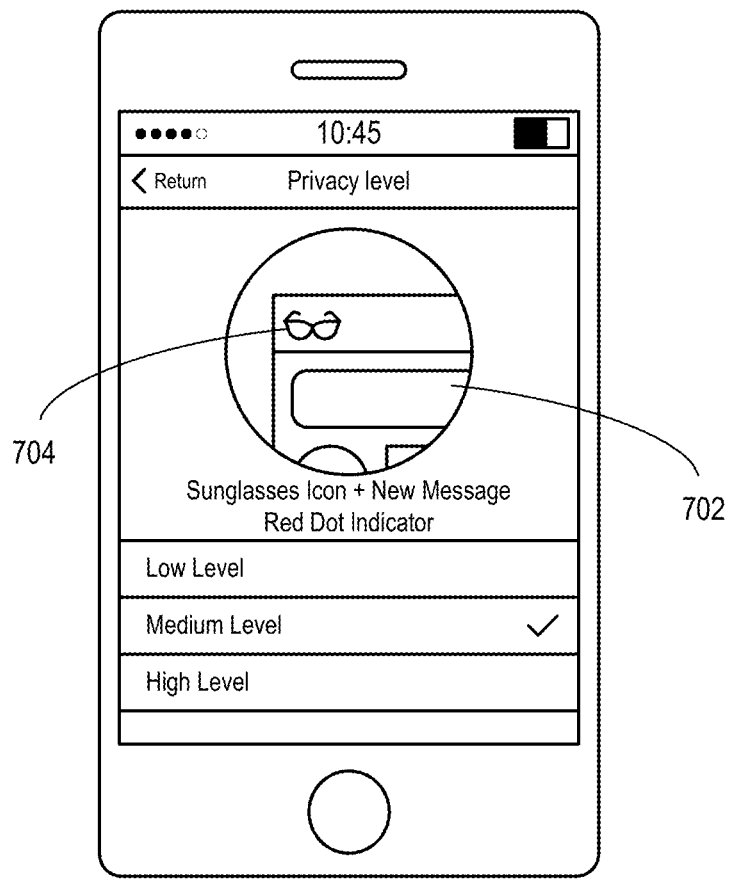
FIG. 7 presents a schematic diagram illustrating an exemplary privacy level configuration page set to a medium privacy level with a preview of a sunglasses icon, in accordance with an embodiment.

FIG. 7 presents a schematic diagram illustrating an exemplary privacy level configuration page set to a medium privacy level with a preview of a sunglasses icon, in accordance with an embodiment. When a user selects the "Medium Level" function option, in a first frame, the system may display a preview image 702 for the message-receivingprompting state as illustrated in FIG. 7. Preview image 702 may indicate that the page entry identifier of the private chat function is represented by a sunglasses icon 704.

Figure 8:
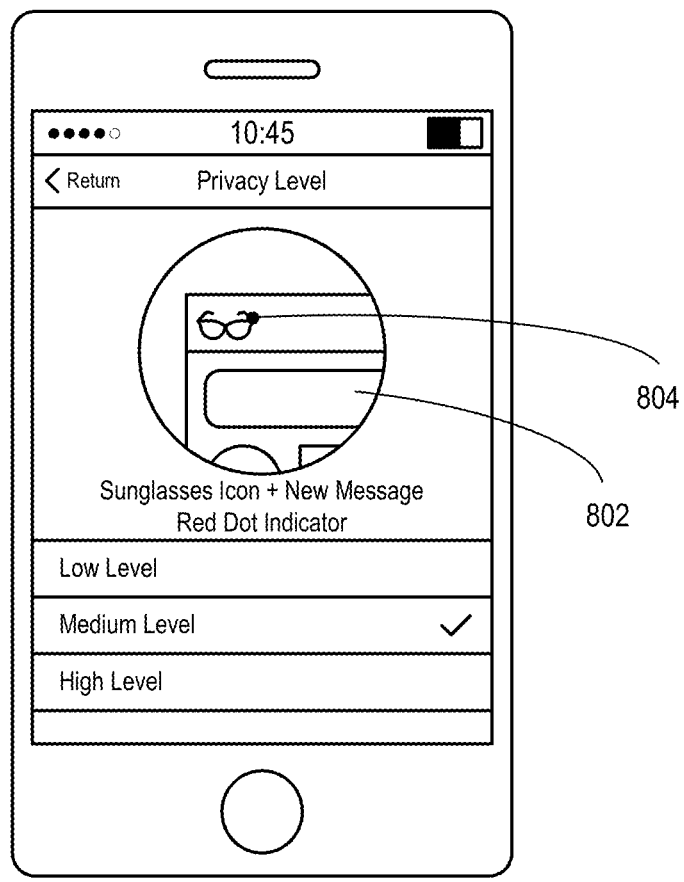
FIG. 8 presents a schematic diagram illustrating an exemplary privacy level configuration page set to a medium privacy level with a preview of a sunglasses icon plus a new message red dot indicator, in accordance with an embodiment.

FIG. 8 presents a schematic diagram illustrating an exemplary privacy level configuration page set to a medium privacy level with a preview of a sunglasses icon plus a new message red dot indicator, in accordance with an embodiment. In a second frame, the system may display a preview image 802 for the non-message-receiving-prompting state as illustrated in FIG. 8. Preview image 802 may indicate that the page entry identifier of the private chat function is represented by a sunglasses icon with a nearby red dot 804 (e.g., indicating that at least one new unread message is available).

Figure 9:
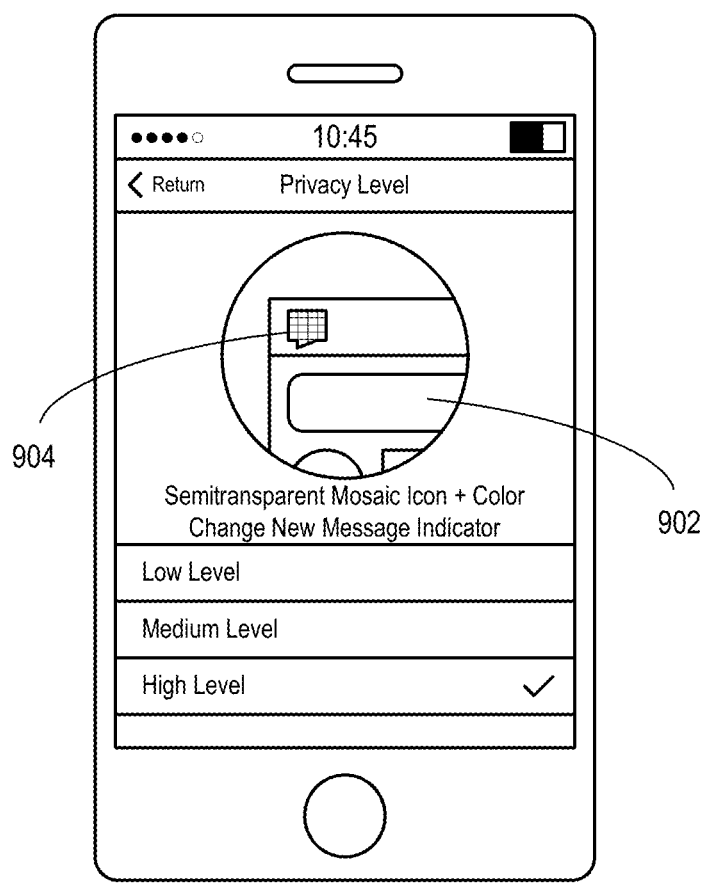
FIG. 9 presents a schematic diagram illustrating an exemplary privacy level configuration page set to a high privacy level with a preview of a semitransparent mosaic icon, in accordance with an embodiment.

FIG. 9 presents a schematic diagram illustrating an exemplary privacy level configuration page set to a high privacy level with a preview of a semitransparent mosaic icon, in accordance with an embodiment. When a user selects the "High Level" function option, in a first frame, the system may display a preview image 902 for the message-receiving-prompting state as illustrated in FIG. 9. Preview image 902 may indicate that the page entry identifier of the private chat function is represented by a semitransparent mosaic icon 904.

Figure 10:
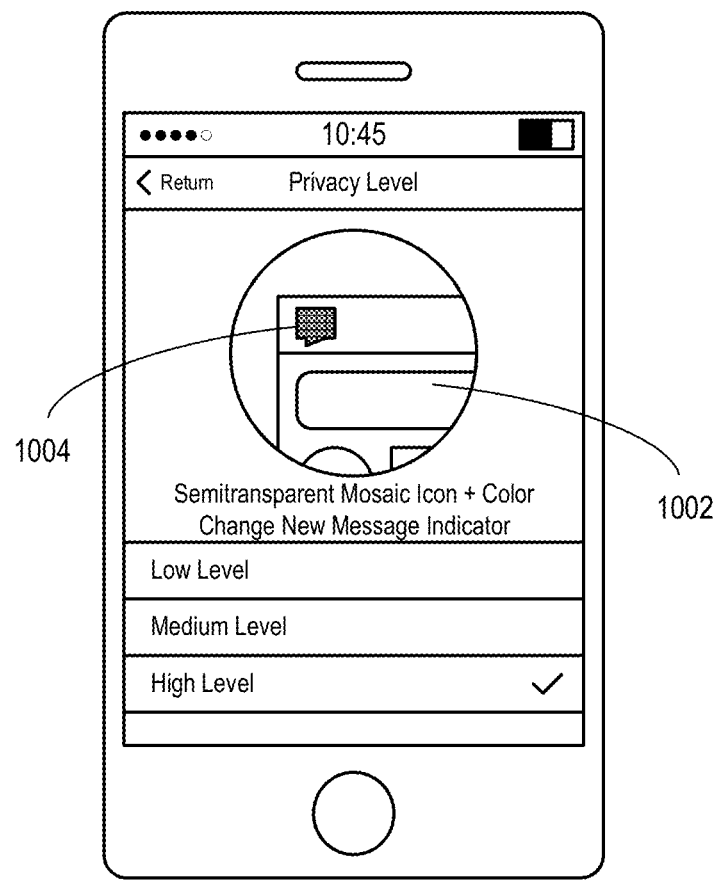
FIG. 10 presents a schematic diagram illustrating an exemplary privacy level configuration page set to a high privacy level with a preview of a semitransparent mosaic icon and a color change indicating a new message, in accordance with an embodiment.

FIG. 10 presents a schematic diagram illustrating an exemplary privacy level configuration page set to a high privacy level with a preview of a semitransparent mosaic icon and a color change indicating a new message, in accordance with an embodiment. In a second frame, the system may display a preview image 1002 for the non-message-receiving-prompting state as illustrated in FIG. 10. Preview image 1002 may indicate that the page entry identifier of the private chat function is represented by a semitransparent mosaic icon with a different color 1004. The icon color displayed for the message-receiving-prompting state is different from the icon color displayed for the non-message-receiving-prompting state. The system may change the mosaic icon from one color to another to indicate that a new unread message is available.

The system may obtain mode configuration information corresponding to the privacy level (operation 304).

The system may perform a configuration operation associated with the private chat function (operation 306). The mode configuration information may include the icons as illustrated in FIG. 5-10. Based on the privacy level selected by the user, the system may configure a corresponding icon as the display element of the page entry identifier corresponding to the private chat function in DingTalk.

The system may perform a notification operation indicating that a new message is available upon receiving a private chat message (operation 308).

Exemplary Message List Page

Figure 11:
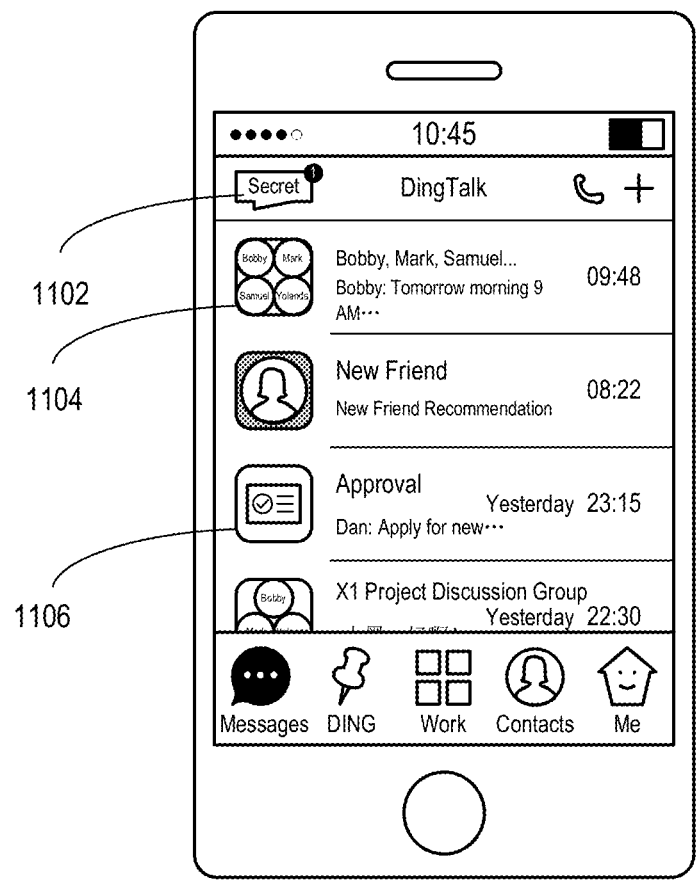
FIG. 11 presents a schematic diagram illustrating an exemplary message list page, in accordance with an embodiment.

FIG. 11 presents a schematic diagram illustrating an exemplary message list page, in accordance with an embodiment. The system may display an icon 1102 representing the page entry identifier on the left upper corner of the message list page of the DingTalk client. The system may display icon 1102 with the word "Secret" and an indicator of the number of new unread messages. Icon 1102 as depicted in FIG. 11 corresponds to the low privacy level.

As illustrated in FIG. 11, the message list page may include icons indicating entry points to other functions (e.g., besides the private chat function) that are supported by the DingTalk client. For example, the message list page may include an icon 1104 indicating an entry point to a group chat page, and an icon 1106 indicating an entry point to an approval feature (or other enterprise management functions collaboratively supported by DingTalk). By centralizing the display of the entry points to the functions, the system facilitates users' viewing and management of these functions. By displaying the icon representing the page entry identifier of the private chat function independently on the upper left corner of the message list page, the system separates the icon representing the page entry identifier from the icons associated with other functions. This provides the corresponding private chat with improved privacy and security. A user may also conveniently use the private chat function by selecting the icon representing the page entry identifier. In particular, with the low privacy level mode, the system may easily remind a user of a private chat and/or the privacy mode by configuring the icon representing the page entry identifier to include the word "Secret." This provides effective operational guidance to the user while distinguishing the page entry identifier from the other functions (e.g., functions other than the private chat function).

Exemplary Private Chat List Page and Exemplary Private Chat Page

Figure 12:
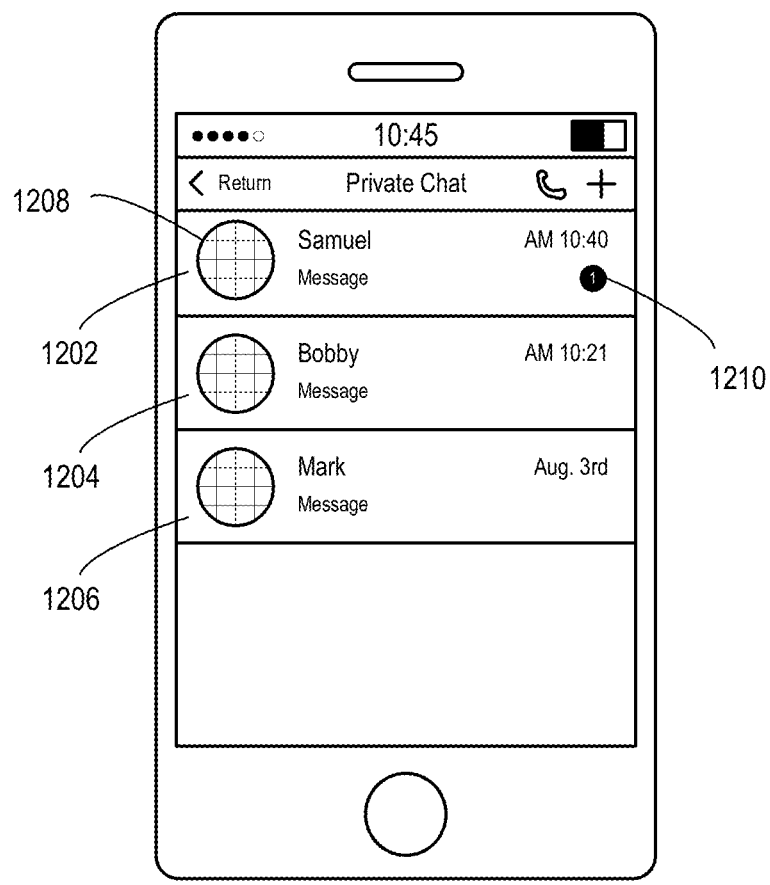
FIG. 12 presents a schematic diagram illustrating an exemplary private chat list page, in accordance with an embodiment.
Figure 13:
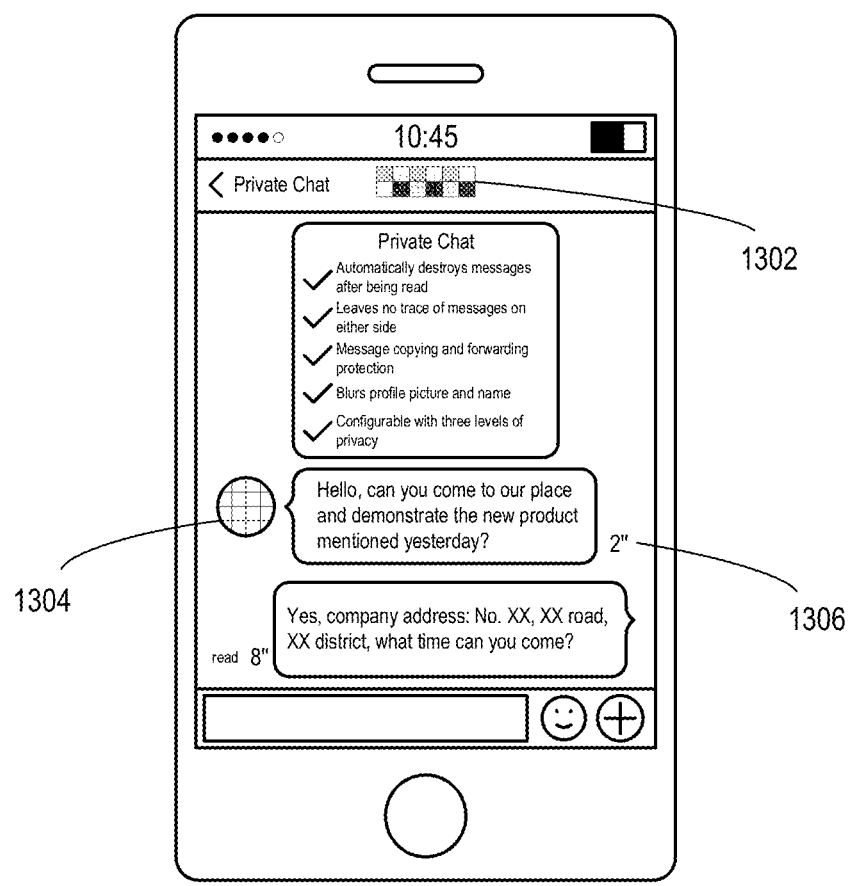
FIG. 13 presents a schematic diagram illustrating an exemplary private chat page, in accordance with an embodiment.

FIG. 12 presents a schematic diagram illustrating an exemplary private chat list page, in accordance with an embodiment. FIG. 13 presents a schematic diagram illustrating an exemplary private chat page, in accordance with an embodiment.

When a user selects the icon representing the page entry identifier illustrated in FIG. 11, the system may display the private chat list page illustrated in FIG. 12. The private chat list page may include private chat page entries 1202-1206 associated with multiple communication partners. Each private chat page entry may include an icon (e.g., such as an icon 1208) indicating an entry point to a private chat page for a communication partner. That is, a user may click on a private chat page entry to view a private chat page associated with a communication partner. In the illustrated private chat list page, the system displays a "①" icon 1210 in private chat page entry 1202 for a communication partner named Samuel to indicate that the user has received a private chat message from Samuel. The user may then view the private chat page for Samuel as illustrated in FIG. 13 by clicking on private chat page entry 1202 for Samuel.

In the private chat list page as illustrated in FIG. 12, the system may prevent other nearby users from viewing sensitive information by applying mosaic processing to users' profile pictures and replacing message preview content with the word "message." The mosaic processing replaces the users' profile pictures and/or names with fuzzy images or graphics so that other users are unable to view the users' information. This improves the privacy provided to the user. In the private chat page as illustrated in FIG. 13, the system may prevent other users from viewing sensitive data through mosaic processing of a name 1302 and a profile picture 1304 of the communication partner Samuel. In some embodiments, the system may also display a visual indicator "2″" 1306 to indicate that the corresponding private chat message will be deleted in two seconds, in order to prompt the user to read as quickly as possible.

The medium privacy level provides better concealment and privacy than the low privacy level. The page entry identifier of the private chat page for the medium privacy level may be represented on the display (e.g., on a message list page) as an icon resembling a pair of sunglasses with a red dot indicating a new message is available, as illustrated in FIG. 7-FIG. 8. In comparison, the icon for the low privacy level includes the word "Secret" with a number indicating the number of new messages. The medium privacy level provides an improved concealing effect since the word "Secret" or other related information is not directly displayed and the red dot does not indicate the number of new messages.

The high privacy level provides even better concealment and privacy than the medium privacy level. The page entry identifier of the private chat page for the high privacy level may be represented on the display (e.g., on a message list page) as a semitransparent mosaic icon. The system may change the color of the semitransparent mosaic icon to indicate a new message is available, as illustrated in FIG. 9-FIG. 10. When nearby users view this mosaic icon quickly, the nearby users almost always ignore the presence of this mosaic icon. Since other users are likely to pay no attention to the change in color of the mosaic icon, there is a very strong camouflage effect, thereby ensuring extremely high privacy.

The system may also display the icon representing the page entry identifier of the private chat function at other locations besides the location depicted in the message list page of FIG. 11. For example, the system may also display the icon representing the page entry identifier on non-private chat pages, such as regular chat pages that do not include the privacy protection features.

Exemplary Regular Chat Window Page

Figure 14:
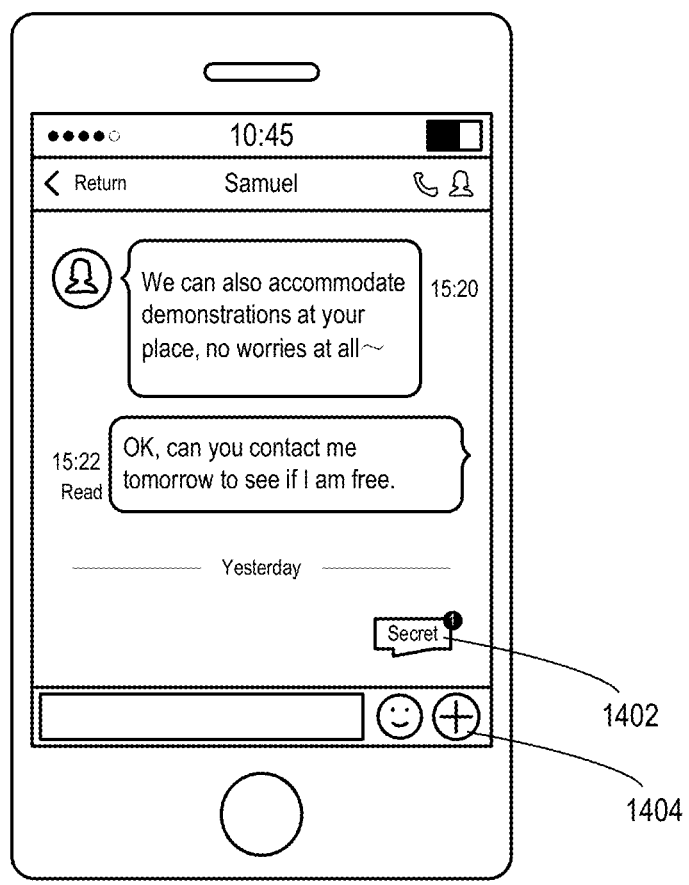
FIG. 14 presents a schematic diagram illustrating an exemplary regular chat window page, in accordance with an embodiment.

FIG. 14 presents a schematic diagram illustrating an exemplary regular chat window page, in accordance with an embodiment. The regular chat window page is an example of a non-private chat page (e.g., the chat is not protected with the privacy protection features). As illustrated in FIG. 14, the system may represent a page entry identifier by displaying an icon with a word "Secret" 1402 on the bottom right corner of the regular chat window page. The user may select an icon displayed as "  " 1404 located on the bottom right corner of the regular chat window page to invoke a function menu page. The function menu page is described below in greater detail with respect to FIG. 15. In FIG. 14, the user is communicating with Samuel on a non-private chat page (e.g., regular chat window page), and the user may quickly switch between the non-private chat page and a private chat page while communicating with Samuel. This simplifies user operation and improves communication efficiency.

Exemplary Function Menu Page

Figure 15:
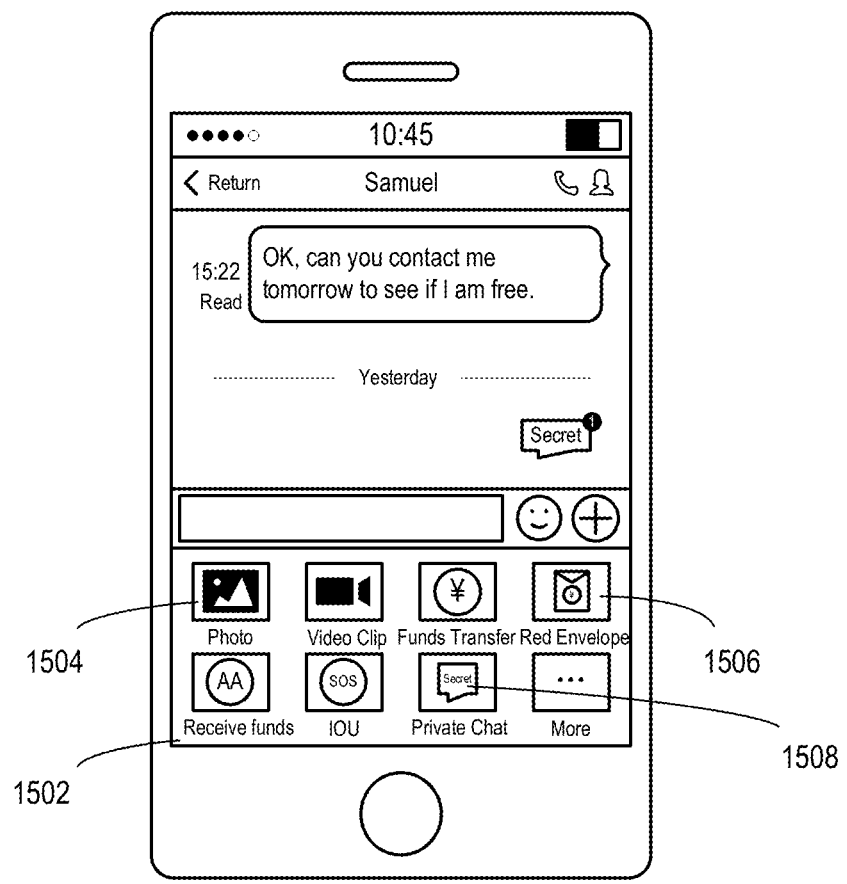
FIG. 15 presents a schematic diagram illustrating another exemplary function menu page, in accordance with an embodiment.

FIG. 15 presents a schematic diagram illustrating an exemplary function menu page, in accordance with an embodiment. The system may display an icon representing a page entry identifier on a function menu page of a regular chat window page. For example, in the regular chat window page as illustrated in FIG. 14, the user may select the "  " icon 1404 on the bottom right corner of the page to invoke a function menu page 1502 as illustrated in FIG. 15. Function menu page 1502 may include multiple predetermined function options, such as photo 1504 and red envelope 1506. As illustrated in FIG. 15, the function menu page may include an icon with the word "Secret" 1508 representing a page entry identifier of the private chat page. The system displays the icon with the word "Secret" 1508 when the communication application is configured to the low privacy level. Further, the display element of the page entry identifier may change when the privacy level changes.

Exemplary Contact Details Page

Figure 16:
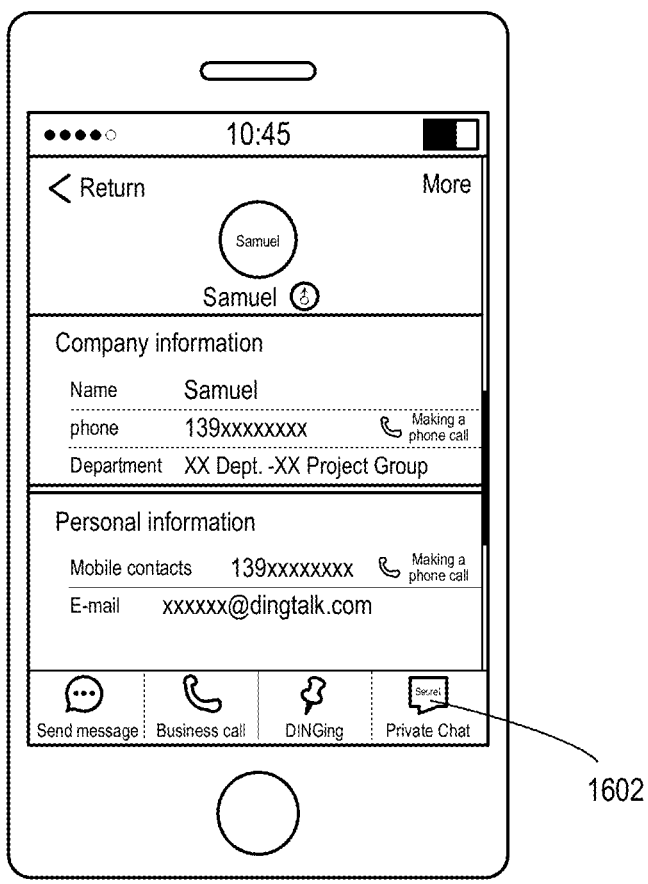
FIG. 16 presents a schematic diagram illustrating an exemplary contact details page, in accordance with an embodiment.

FIG. 16 presents a schematic diagram illustrating an exemplary contact details page, in accordance with an embodiment. The system may display an icon representing the page entry identifier on the contact details page of the communication application. For example, the lower right corner of the contact details page illustrated in FIG. 16 displays an icon 1602 representing the page entry identifier of the private chat page. The system may change the display element of the page entry identifier to correspond to changes to the privacy level. For example, when the system configures the communication application to the low privacy level, the page entry identifier may be represented by icon 1602, which is displayed with the word "Secret" as illustrated in FIG. 16.

The system may automatically delete the private chat message (operation 310).

DingTalk may monitor the read states of private chat messages received by a receiving party. When the system changes a private chat message from an unread state to a read state, DingTalk may start a timer with a predetermined duration and delete the corresponding private chat message upon the timer's timeout. For example, on the private chat page illustrated in FIG. 13, the system may display the remaining duration of the timer near the corresponding private chat message. As illustrated, the system may display a visual indicator "2″" 1302 to indicate that the corresponding private chat message will be deleted in two seconds, in order to prompt the user to read as quickly as possible.

The predetermined duration of the timer may be a fixed duration. The predetermined duration of the timer may also depend on the privacy level of the private chat function. For example, when the privacy level is higher, the system may reduce the predetermined duration of the timer, so as to delete the corresponding private chat message as quickly as possible and provide a greater degree of privacy.

Since the system deletes the private chat message after the predetermined duration, the system does not leave any indication of the private chat message and correspondence with the communication partner. The system may perform mosaic processing on the name and profile picture of the communication partner in the private chat page as illustrated in FIG. 13. Thus, even if the message recipient takes a screen shot before the private chat message is deleted, the system may ensure that the privacy of the communication partner is not violated.

Exemplary Embodiments

Embodiments of the present disclosure include a system for private communication. During operation, the system may receive user input selecting a privacy level from a plurality of privacy levels associated with a private chat function of a communication application. The private chat function may be configured to transmit and receive private chat messages, and each privacy level may be associated with visual effects which are different from the visual effects of other privacy levels. The system may obtain mode configuration information corresponding to the selected privacy level. The system may then configure the private chat function for the communication application based on the obtained mode configuration information, and display the visual effects for the communication application according to the selected privacy level.

In a variation on this embodiment, the system may configure a display mode of the private chat function with the obtained mode configuration information, in which the visual intensity of the display mode is inversely related to the privacy level.

In a variation on this embodiment, configuring the private chat function for the communication application based on the obtained mode configuration information may include configuring a display element of a page entry identifier when a preset function page of the communication application includes the page entry identifier of the private chat function.

In a further variation, the preset function page is at least one of the following: a message list page of the communication application, a regular chat window page of the communication application, a function menu page associated with the regular chat window page, and a contact details page of the communication application.

In a further variation, the display element may include a first display element associated with a message-receiving-prompting state and a second display element associated with a non-message-receiving-prompting state.

In a further variation, the first display element associated with a predefined low privacy level may include a text icon corresponding to the private chat function. The second display element associated with the predefined low privacy level may include the text icon corresponding to the private chat function with a number indicating a quantity of new messages near the text icon. The first display element associated with a predefined medium privacy level may include a graphic icon corresponding to the private chat function. The second display element associated with the predefined medium privacy level may include the graphic icon corresponding to the private chat function with a visual indicator near the graphic icon signaling that there is at least one new message. The first display element associated with a predefined high privacy level may include a fuzzy icon displayed with a first color corresponding to the private chat function. The second display element associated with the predefined high privacy level may include the fuzzy icon displayed with a second color that signals at least one new message is available.

In a variation on this embodiment, the system may perform at least one of determining a general privacy level configured by the user for all associated communication partners listed in the communication application, and determining an individual privacy level configured by the user for a respective communication partner listed in the communication application.

In a variation on this embodiment, configuring the private chat function for the communication application based on the obtained mode configuration information may include configuring a waiting duration corresponding to the private chat function, in which the waiting duration is inversely related to the selected privacy level. Furthermore, any private chat message received by the private chat function is automatically deleted when a reading duration associated with the private chat message for a corresponding user reaches the waiting duration.

In a variation on this embodiment, the system may automatically delete a private chat message after the private chat message changes from an unread state to a read state.

In a variation on this embodiment, the plurality of privacy levels includes three privacy levels comprising a low privacy level, a medium privacy level, and a high privacy level.

Exemplary Electronic Device

Figure 17:
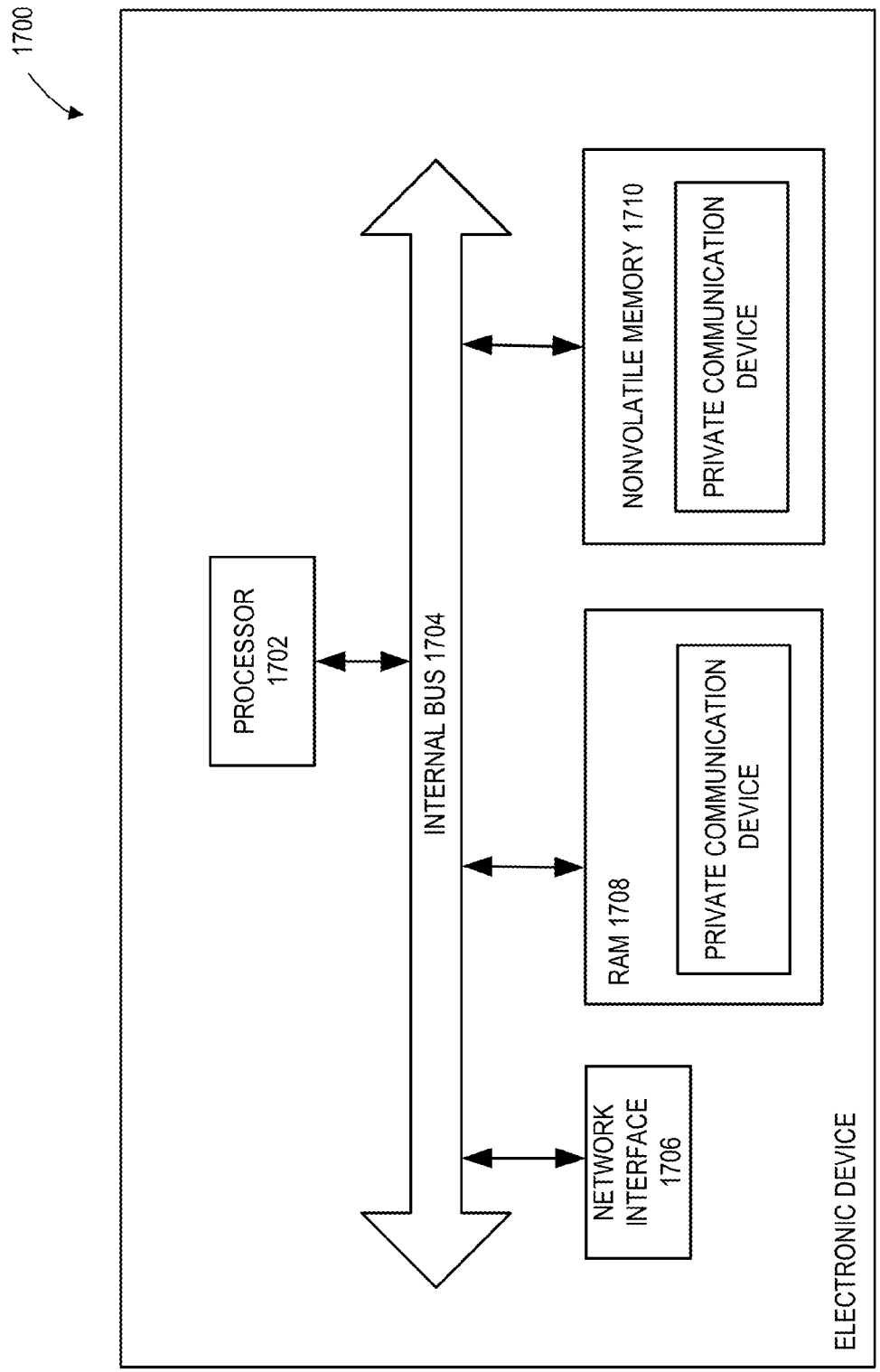
FIG. 17 presents a schematic diagram illustrating an exemplary electronic device, in accordance with an embodiment.

FIG. 17 presents a schematic diagram illustrating an exemplary electronic device 1700, in accordance with an embodiment. Electronic device 1700 may represent a private communication device. At the hardware level, electronic device 1700 may include a processor 1702, an internal bus 1704, a network interface 1706, random access memory (RAM) 1708, and nonvolatile memory 1710. The electronic device may include other components for private communication. Processor 1702 may read a corresponding computer program from nonvolatile memory 1710 and store the computer program in RAM 1708, and then execute the program.

Exemplary Private Communication Device

Figure 18:
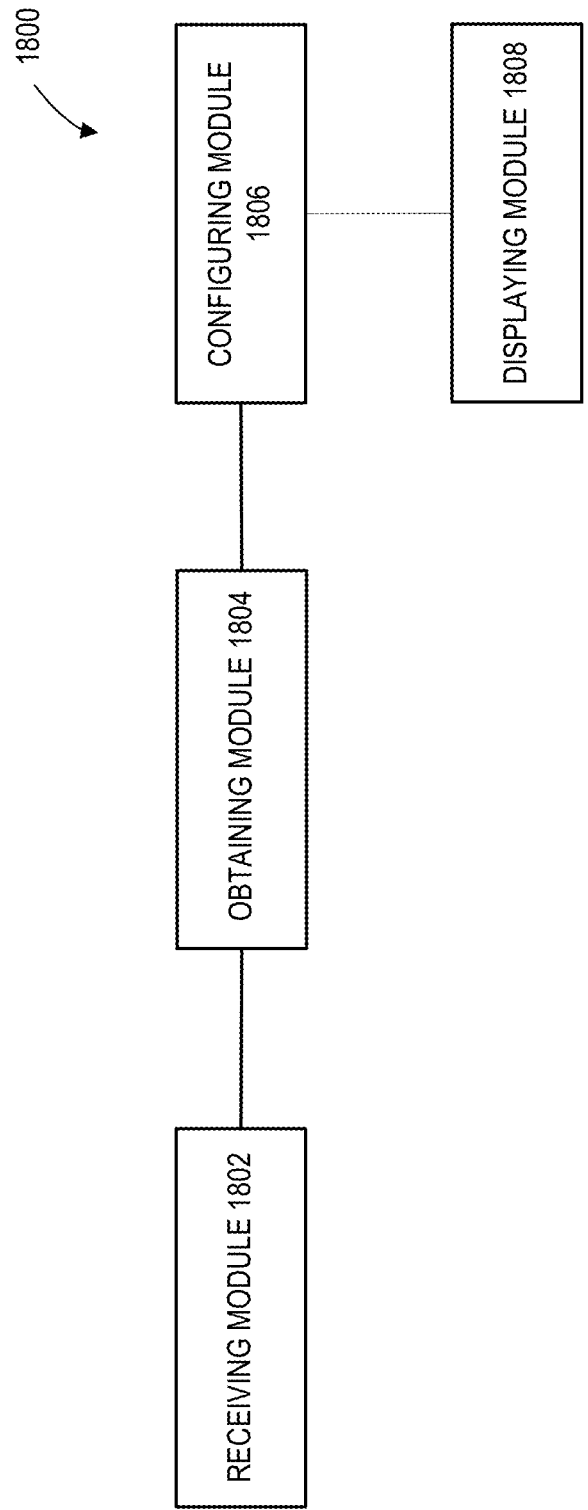
FIG. 18 presents a schematic diagram illustrating an exemplary private communication device, in accordance with an embodiment.

FIG. 18 presents a schematic diagram illustrating an exemplary private communication device 1800, in accordance with an embodiment. Private communication device 1800 may represent a device with message sending and receiving capabilities. Private communication device 1800 may include a receiving module 1802, an obtaining module 1804, a configuring module 1806, and a displaying module 1808.

Receiving module 1802 may receive user input selecting a privacy level from a plurality of privacy levels associated with a private chat function of a communication application, in which the private chat function may be configured to transmit and receive private chat messages. Each privacy level may be associated with visual effects which are different from the visual effects of other privacy levels. The private chat message may be automatically deleted after the message recipient reads the private chat message.

Obtaining module 1804 may obtain mode configuration information corresponding to the selected privacy level.

Configuring module 1806 may configure the private chat function for the communication application based on the obtained mode configuration information.

Displaying module 1808 may display the visual effects for the communication application according to the selected privacy level.

Optionally, the system may use the mode configuration information to configure the display mode of the private chat function. The visual intensity of the display mode may be inversely related to the privacy level.

Optionally, configuring module 1806 may configure the display element of a page entry identifier when a preset function page of the communication application includes a page entry identifier of the private chat function.

Optionally, the preset function page may include at least one of the following pages: a message list page of the communication application, a regular chat window page of the communication application, a function menu page associated with the regular chat window page, and a contact details page of the communication application.

Optionally, the display element may include a first display element associated with a message-receiving-prompting state and a second display element associated with a non-message-receiving-prompting state. In the message-receiving-prompting state, the system displays an icon informing the user of the selected privacy level and the system is waiting to receive a new message. In the non-message-receiving-prompting state, the system receives one or more messages and informs the user of the availability of new unread messages.

Optionally, the first display element associated with a predefined low privacy level may include a text icon corresponding to the private chat function. The second display element associated with the predefined low privacy level may include a text icon corresponding to the private chat function with a number indicating a quantity of new unread messages near the text icon.

The first display element associated with a predefined medium privacy level may include a graphic icon corresponding to the private chat function. The second display element associated with the predefined medium privacy level may include a graphic icon corresponding to the private chat function with a visual indicator near the graphic icon signaling that there is at least one new unread message.

The first display element associated with a predefined high privacy level may include a fuzzy icon displayed with a first color corresponding to the private chat function. The second display element associated with the predefined high privacy level may include the fuzzy icon displayed with a second color indicating that a new unread message is available.

Optionally, receiving module 1802 may determine the user-specified privacy levels for individual communication partners, groups of communication partners, or all communication partners. The system may determine the individual privacy levels configured by the user for different communication partners listed in the communication application. The user may configure different privacy levels for different communication partners or different groups of communication partners. The user may configure a privacy level for all associated communication partners listed in the communication application.

Optionally, configuring module 1806 may configure the waiting duration corresponding to the private chat function. The waiting duration may be inversely related to the privacy level. The system may automatically delete any private chat message received by the private chat function when the reading duration associated with the private chat message for a corresponding user reaches the waiting duration.

Exemplary Private Communication Device

Figure 19:
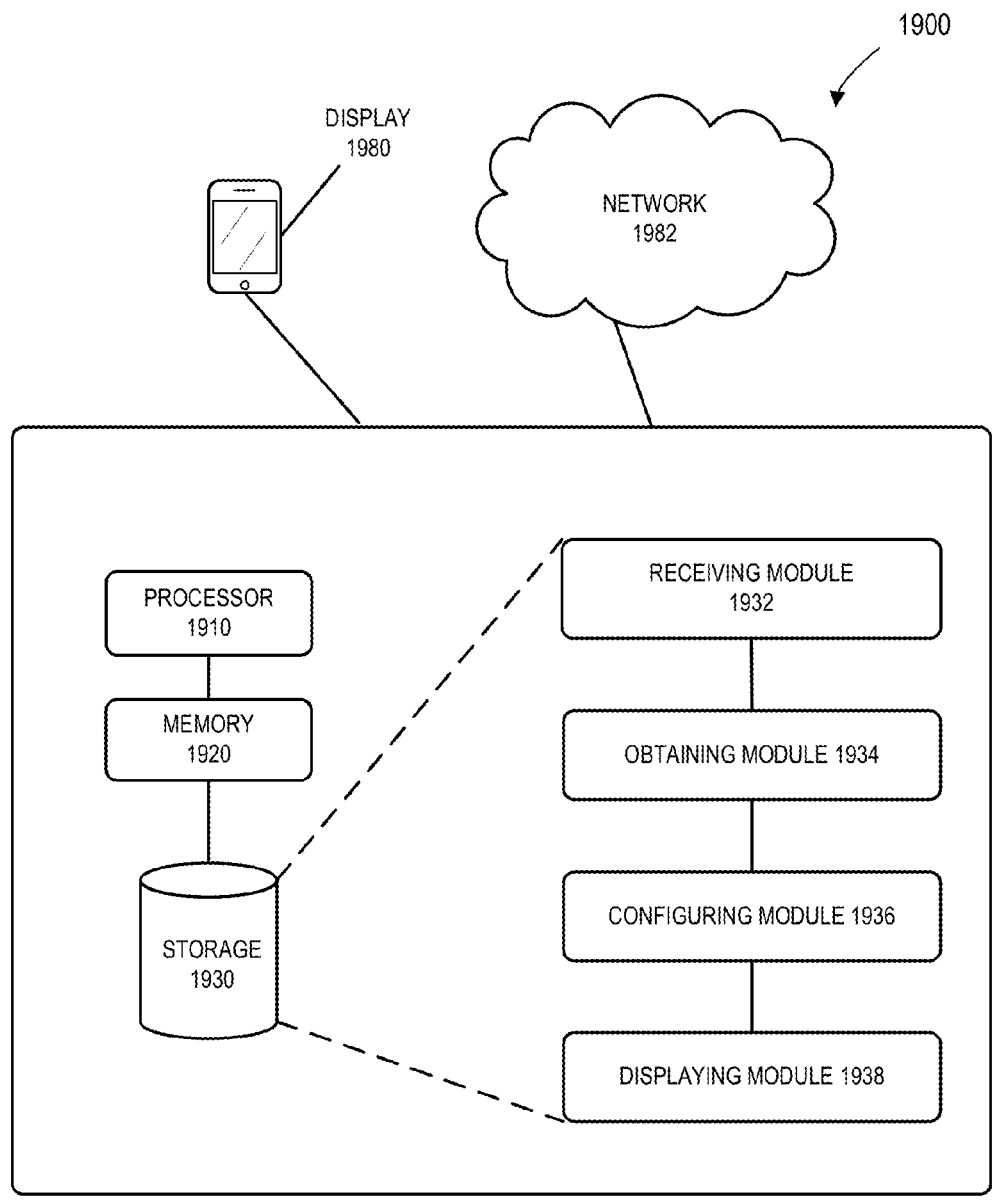
FIG. 19 presents a schematic diagram illustrating an exemplary private communication device, in accordance with an embodiment of the present application.

FIG. 19 presents a schematic diagram illustrating an exemplary private communication device 1900, in accordance with an embodiment of the present application. Private communication device 1900 may include a processor 1910, a memory 1920, and a storage device 1930. Storage 1930 typically stores instructions that can be loaded into memory 1920 and executed by processor 1910 to perform the methods described above. In one embodiment, the instructions in storage 1930 can implement a receiving module 1932, an obtaining module 1934, a configuring module 1936, and a displaying module 1938, which can communicate with each other through various means.

In some embodiments, modules 1932-1938 can be partially or entirely implemented in hardware and can be part of processor 1910. Further, in some embodiments, the private communication device may not include a separate processor and memory. Instead, in addition to performing their specific tasks, modules 1932-1938, either separately or in concert, may be part of special-purpose computation engines.

Storage 1930 stores programs to be executed by processor 1910. Specifically, storage 1930 stores a program that implements a device for private communication. During operation, the application program can be loaded from storage 1930 into memory 1920 and executed by processor 1910. As a result, private communication device 1900 can perform the functions described above. Private communication device 1900 can further include a display 1980, and can be coupled via one or more network interfaces to a network 1982.

Receiving module 1932 may receive user input selecting a privacy level from a plurality of privacy levels associated with a private chat function of a communication application, in which the private chat function is configured to transmit and receive private chat messages. Each privacy level may be associated with visual effects which are different from the visual effects of other privacy levels. A private chat message may be automatically deleted after the recipient reads the private chat message.

Obtaining module 1934 may obtain mode configuration information corresponding to the selected privacy level.

Configuring module 1936 may configure the private chat function for the communication application based on the obtained mode configuration information.

Displaying module 1938 may display the visual effects for the communication application according to the selected privacy level.

Exemplary Server

Figure 20:
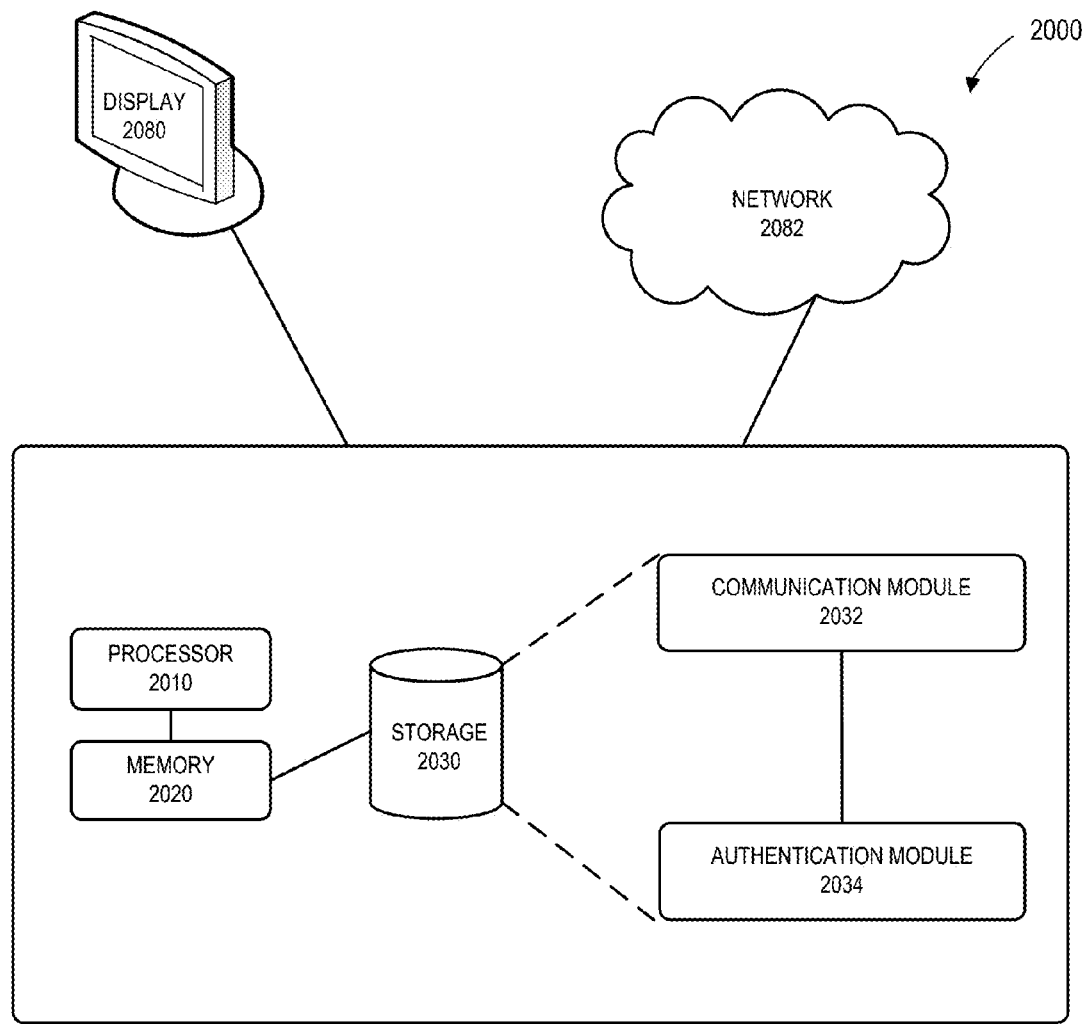
FIG. 20 presents a schematic diagram illustrating an exemplary server, in accordance with an embodiment.

FIG. 20 presents a schematic diagram illustrating an exemplary server, in accordance with an embodiment of the present application. Server 2000 may include a processor 2010, a memory 2020, and a storage device 2030. Storage 2030 typically stores instructions that can be loaded into memory 2020 and executed by processor 2010 to perform the methods described above. In one embodiment, the instructions in storage 2030 can implement a communication module 2032 and an authentication module 2034, which can communicate with each other through various means.

In some embodiments, modules 2032-2034 can be partially or entirely implemented in hardware and can be part of processor 2010. Further, in some embodiments, server 2000 may not include a separate processor and memory. Instead, in addition to performing their specific tasks, modules 2032-2034, either separately or in concert, may be part of special-purpose computation engines.

Storage 2030 stores programs to be executed by processor 2010. Specifically, storage 2030 stores a program that implements a device for non-private and private communication. During operation, the application program can be loaded from storage 2030 into memory 2020 and executed by processor 2010. As a result, server 2000 can perform the functions described above. Server 2000 can further include a display 2080, and can be coupled via one or more network interfaces to a network 2082.

Communication module 2032 may perform server functions to facilitate regular communications and private communications. In some embodiments, communication module 2032 may forward messages and maintain user profiles. Communication module 2032 may also perform other server functions, such as maintaining code for download by client devices.

Authentication module 2034 may authenticate users when the users log on to the server.

The embodiments disclosed herein may be implemented on various universal or dedicated computer system environments or configurations. For example, the computer systems may include personal computers, server computers, handheld or portable devices, tablet-type devices, multiprocessor systems, microprocessor-based systems, set-top boxes, programmable electronic consumption devices, network PCs, minicomputers, mainframe computers, distributed computing environments including any of the above systems or devices, and the like.

The embodiments disclosed herein may be described within the general context of computer-executable instructions executed by a computer, such as a program module. Generally, the program module may include a routine, a program, an object, an assembly, a data structure and the like for implementing particular tasks or achieving particular abstract data types. The embodiments disclosed herein may also be implemented in distributed computing environments, in which tasks are performed by remote processing devices connected via a communication network. In the distributed computing environments, program modules may be located in local and remote computer storage media that may include a storage device.

The data structures and computer instructions described in this detailed description are typically stored on a computer-readable storage medium, which may be any device or medium that can store code and/or data for use by a computer system. The computer-readable storage medium may include, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for private communication, comprising:
   obtaining mode configuration information corresponding to a selected privacy level from a plurality of privacy levels associated with a private chat function of a communication application, wherein the private chat function is configured to transmit and receive private chat messages, and each privacy level is associated with visual effects which are different from the visual effects of other privacy levels;
   configuring the private chat function for the communication application based on the obtained mode configuration information;
   configuring a display mode of the private chat function with the obtained mode configuration information, wherein a visual intensity of the display mode is inversely related to the selected privacy level; and
   displaying the visual effects for the communication application according to the selected privacy level and the configured display mode.

2. The method of claim 1, wherein configuring the private chat function for the communication application based on the obtained mode configuration information further comprises:
   configuring a display element of a page entry identifier when a preset function page of the communication application includes the page entry identifier of the private chat function.

3. The method of claim 2, wherein the preset function page is at least one of the following: a message list page of the communication application, a regular chat window page of the communication application, a function menu page associated with the regular chat window page, and a contact details page of the communication application.

4. The method of claim 2, wherein the display element comprises a first display element associated with a message-receiving-prompting state and a second display element associated with a non-message-receiving-prompting state.

5. The method of claim 4, wherein
   the first display element associated with a predefined low privacy level comprises a text icon corresponding to the private chat function;
   the second display element associated with the predefined low privacy level comprises the text icon corresponding to the private chat function with a number indicating a quantity of new messages near the text icon;
   the first display element associated with a predefined medium privacy level comprises a graphic icon corresponding to the private chat function;
   the second display element associated with the predefined medium privacy level comprises the graphic icon corresponding to the private chat function with a visual indicator near the graphic icon signaling that there is at least one new message;
   the first display element associated with a predefined high privacy level comprises a fuzzy icon displayed with a first color corresponding to the private chat function; and
   the second display element associated with the predefined high privacy level comprises the fuzzy icon displayed with a second color signaling at least one new message is available.

6. The method of claim 1, further comprising:
   performing at least one of determining a general privacy level configured by the user for all associated communication partners listed in the communication application, and
   determining an individual privacy level configured by the user for a respective communication partner listed in the communication application.

7. The method of claim 1, wherein configuring the private chat function for the communication application based on the obtained mode configuration information comprises:
   configuring a waiting duration corresponding to the private chat function, wherein the waiting duration is inversely related to the selected privacy level, and any private chat message received by the private chat function is automatically deleted when a reading duration associated with the private chat message for a corresponding user reaches the waiting duration.

8. The method of claim 1, wherein a respective private chat message is automatically deleted after the respective private chat message changes from an unread state to a read state.

9. The method of claim 1, wherein the plurality of privacy levels includes three privacy levels comprising a low privacy level, a medium privacy level, and a high privacy level.

10. A computing system comprising:
    one or more processors; and
    a non-transitory computer-readable storage medium coupled to the one or more processors storing instructions stored that, when executed by the one or more processors, cause the computing system to perform a method for private communication, the method comprising:

obtaining mode configuration information corresponding to a selected privacy level from a plurality of privacy levels associated with a private chat function of a communication application, wherein the private chat function is configured to transmit and receive private chat messages, and each privacy level is associated with visual effects which are different from the visual effects of other privacy levels;

configuring the private chat function for the communication application based on the obtained mode configuration information;

configuring a display mode of the private chat function with the obtained mode configuration information, wherein a visual intensity of the display mode is inversely related to the selected privacy level; and displaying the visual effects for the communication application according to the selected privacy level and the configured display mode.

11. The system of claim 10, wherein configuring the private chat function for the communication application based on the obtained mode configuration information further comprises:

configuring a display element of a page entry identifier when a preset function page of the communication application includes the page entry identifier of the private chat function.

12. The system of claim 11, wherein the preset function page is at least one of the following: a message list page of the communication application, a regular chat window page of the communication application, a function menu page associated with the regular chat window page, and a contact details page of the communication application.

13. The system of claim 11, wherein the display element comprises a first display element associated with a message-receiving-prompting state and a second display element associated with a non-message-receiving-prompting state.

14. The system of claim 13, wherein the first display element associated with a predefined low privacy level comprises a text icon corresponding to the private chat function;

the second display element associated with the predefined low privacy level comprises the text icon corresponding to the private chat function with a number indicating a quantity of new messages near the text icon;

the first display element associated with a predefined medium privacy level comprises a graphic icon corresponding to the private chat function;

the second display element associated with the predefined medium privacy level comprises the graphic icon corresponding to the private chat function with a visual indicator near the graphic icon signaling that there is at least one new message;

the first display element associated with a predefined high privacy level comprises a fuzzy icon displayed with a first color corresponding to the private chat function; and the second display element associated with the predefined high privacy level comprises the fuzzy icon displayed with a second color signaling at least one new message is available.

15. The system of claim 10, further comprising:

performing at least one of determining a general privacy level configured by the user for all associated communication partners listed in the communication application, and determining an individual privacy level configured by the user for a respective communication partner listed in the communication application.

16. The system of claim 10, wherein configuring the private chat function for the communication application based on the obtained mode configuration information comprises:

configuring a waiting duration corresponding to the private chat function, wherein the waiting duration is inversely related to the selected privacy level, and any private chat message received by the private chat function is automatically deleted when a reading duration associated with the private chat message for a corresponding user reaches the waiting duration.

17. A non-transitory computer-readable storage medium storing instructions that when executed by a computer cause the computer to perform a method for private communication, the method comprising:

obtaining mode configuration information corresponding to a selected privacy level from a plurality of privacy levels associated with a private chat function of a communication application, wherein the private chat function is configured to transmit and receive private chat messages, and each privacy level is associated with visual effects which are different from the visual effects of other privacy levels;

configuring the private chat function for the communication application based on the obtained mode configuration information;

configuring a display mode of the private chat function with the obtained mode configuration information, wherein a visual intensity of the display mode is inversely related to the selected privacy level; and displaying the visual effects for the communication application according to the selected privacy level and the configured display mode.

* * * * *